(12) United States Patent
Kodera et al.

(10) Patent No.: US 6,195,149 B1
(45) Date of Patent: Feb. 27, 2001

(54) METHOD FOR PRODUCING A LIQUID CRYSTAL PANEL

(75) Inventors: Takumi Kodera; Kozo Gyota; Fumio Obata; Masami Murata, all of Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 08/860,098

(22) PCT Filed: Nov. 5, 1996

(86) PCT No.: PCT/JP96/03236

§ 371 Date: Jul. 22, 1997

§ 102(e) Date: Jul. 22, 1997

(87) PCT Pub. No.: WO97/16764

PCT Pub. Date: May 9, 1997

(30) Foreign Application Priority Data

Nov. 2, 1995 (JP) ................................................ 7-286287
Mar. 6, 1996 (JP) ................................................ 8-049013

(51) Int. Cl.[7] ........................ G02F 1/1339; G02F 1/1341
(52) U.S. Cl. ........................... 349/187; 349/189; 349/190
(58) Field of Search ................................ 349/73, 92, 153, 349/154, 158, 187, 189, 190, 155; 430/20; 445/24, 25; 324/770

(56) References Cited

U.S. PATENT DOCUMENTS

| | | | |
|---|---|---|---|
| 4,094,058 | * 6/1978 | Yasutake et al. | 349/190 |
| 5,459,597 | * 10/1995 | Yamamoto et al. | 349/154 |
| 5,492,582 | * 2/1996 | Ide et al. | 349/155 |
| 5,629,787 | * 5/1997 | Tsubota et al. | 349/155 |

FOREIGN PATENT DOCUMENTS

| | | |
|---|---|---|
| 59-149324 | 8/1984 | (JP) . |
| 59-151131 | 8/1984 | (JP) . |
| 61-118726 | 6/1986 | (JP) . |
| 63-143526 | 6/1988 | (JP) . |
| 3-24522 | 2/1991 | (JP) . |

* cited by examiner

Primary Examiner—William L. Sikes
Assistant Examiner—Tai V. Duong
(74) Attorney, Agent, or Firm—Oliff & Berridge, PLC

(57) ABSTRACT

A method for producing a liquid crystal panel by forming a plurality of liquid crystal sealing-in areas between a transparent pair of large-area substrates and dividing the liquid crystal sealing-in areas into separate liquid crystal sealing-in areas. The method includes (A) forming transparent electrodes which form a plurality of liquid crystal panels on a surface of each of the large-area substrates, (B) forming seals, each of which surround the transparent electrode required to form one liquid crystal panel, on one of the large-area substrates in order to form liquid crystal injection openings, and forming liquid crystal injection openings in the seals, (C) bonding together the large-area substrates such that their transparent electrodes face each other, with the seals interposed therebetween, (D) removing a portion of one of the pair of large-area substrates such that the liquid crystal injection opening is exposed to the outside, (E) injecting liquid crystal into the liquid crystal sealing-in area through the liquid crystal injection opening exposed to the outside, and then sealing the liquid crystal injection opening with a sealing agent, and (F) dividing the pair of large-area substrates into separate panels after the liquid crystal injection. According to this method, liquid crystal injection can be performed without completely cutting the large-area liquid crystal panel so that the production steps are simplified.

18 Claims, 18 Drawing Sheets

METHOD FOR PRODUCING A LIQUID CRYSTAL PANEL

BACKGROUND OF THE INVENTION

1. Field of the Invention

The invention broadly relates to a method for producing a liquid crystal panel. More particularly, the invention relates to a method for producing a liquid crystal panel in which a plurality of liquid crystal panels are produced by cutting a large-area liquid crystal panel having a plurality of liquid crystal sealing-in areas formed between a pair of large-area substrates.

2. Description of Related Art

In a known conventional method for producing a liquid crystal panel, a large-area liquid crystal panel is formed by forming a plurality of liquid crystal sealing-in areas in a plane between a pair of large-area substrates, and the large-area liquid crystal panel is cut into a plurality of liquid crystal panels. FIGS. 28 to 31 schematically illustrate the conventional method for producing a liquid crystal panel.

Referring to FIG. 28, for example, predetermined wirings, transparent electrodes, and active elements are formed on the inside faces of two transparent substrates 101 and 104, each of which is made of glass, followed by coating of orientation films. Then, seals 106 are printed on either one of the transparent substrates 101 and 104 to form liquid crystal sealing-in areas 117, followed by bonding of the transparent substrates 101 and 104 using the seals 106, as shown in FIG. 28, thereby forming a large-area empty panel 110 with the plurality of liquid crystal sealing-in areas 117 arranged in a plane. A liquid crystal injection opening 106a is formed in each liquid crystal sealing-in area 117 bordered by its associated seal 106.

Thereafter, cuts or grooves 108 are scribed in the surfaces of the transparent substrates 101 and 104. Two parallel scribed grooves 108 each are formed along the direction of arrangement of the liquid crystal injection openings 106a, of which one of each pair crosses the liquid crystal injection openings 106a. When pressure is applied to the vicinity of these scribed grooves 108 to cut the transparent substrates 101 and 104, the large-area empty panel 110 is cut into rectangular intermediate-area empty panels 10a, with the liquid crystal injection openings 106a and the connecting terminals 120a exposed to the outside, as shown in FIG. 29.

From the liquid crystal injection openings 106a, liquid crystal is injected into the intermediate-area empty panels 110a, after which the liquid crystal injection openings 106a are sealed. This forms intermediate-area liquid crystal panels with the liquid crystal layer sealed in the liquid crystal sealing-in areas 117. Thereafter, as shown in FIG. 30, grooves 118 are scribed on each of the intermediate-area liquid crystal panels 110a. The scribed grooves 118 divide the intermediate-area liquid crystal panels 110a according to the individual liquid crystal sealing-in areas 11, and allow connecting terminals 120b formed on the inside surface of the transparent substrate 101 to be exposed to the outside so as to extend from the sides of the liquid crystal sealing-in areas 117. Applying pressure to the vicinity of these scribed grooves 118 to cut the intermediate-area liquid crystal panels 110a results in the production of individual liquid crystal panels 119, as shown in FIG. 31.

In the above-described conventional method for producing a liquid crystal panel, however, it is necessary to cut the large-area empty panel 110 (FIG. 28) into intermediate-area empty panels 110a (FIG. 29), and to further cut the intermediate-area liquid crystal panels 110a formed by filling the intermediate-area empty panels 110a with liquid crystal into the individual liquid crystal panels 119, so that it is necessary to prepare producing devices and panel jigs in correspondence with the large-area empty panel 110, the intermediate-area empty panels or the intermediate-area liquid crystal panels 110a, and producing devices, inspection devices, and panel jigs for the individual liquid crystal panels. This results in higher facility costs and more complicated steps.

Liquid crystal panels of different standards that are constructed with different dimensions may be formed in the large-area empty panel. In such a case, the intermediate-area empty panels and individual liquid crystal panels formed by dividing the large-area panel have different structures and dimensions, which results in more sophisticated step control and thus increased production costs.

In addition, since the large-area panel is completely cut during the production process, pieces of glass flies from the cut portions of the cut panel, so that, for example, the pieces of glass stick onto the surfaces of the connecting terminals 120a and 120b in the liquid crystal panels 119. This gives rise to the problem of poor connection when, for example, connecting integrated circuits and flexible substrates to the connecting terminals 120a and 120b.

In view of the above-described problems, an object of the invention is to provide a method for producing a liquid crystal panel, which allows a large-area empty panel to be successively processed, without cutting it completely during the liquid crystal panel producing process, thereby reducing production costs such as facility costs and control costs, and preventing the production of defective products due to flying pieces of glass.

SUMMARY OF THE INVENTION

To these ends, according to the invention, there is provided a method for producing a liquid crystal by forming a plurality of liquid crystal sealing-in areas between a pair of large-area substrates, at least one of the substrates being a light-transmitting substrate, and cutting the plurality of liquid crystal sealing-in areas into separate areas, the method comprising:

(1) an electrode forming step in which transparent electrodes required to form a plurality of liquid crystal panels are formed an a surface of each substrate of the pair of large-area substrates;

(2) a seal forming step performed on the electrode-formed surface of one of the pair of large-area substrates, in which a plurality of seals, each of which surround the transparent electrode required to form one liquid crystal panel, are formed to form the plurality of liquid crystal sealing-in areas, and liquid crystal injection openings are formed in each of the seals;

(3) a substrate bonding step in which the pair of large-area substrates are bonded together such that the transparent electrode of one large-area substrate faces the transparent electrode of the other of the large-area substrates, with the seals interposed between the substrates;

(4) a substrate removing step in which a portion of one of the pair of large-area substrates bonded together is removed such that at least one of the liquid crystal injection openings is exposed to the outside;

(5) a liquid crystal sealing-in step in which liquid crystal is injected into the liquid crystal sealing-in area through the liquid crystal injection opening exposed to the outside, and then the liquid crystal injection opening is sealed; and (6) a panel dividing step in which the pair of bonded large-area substrates are divided into separate liquid crystal panels after the liquid crystal injection.

In the above-described method for producing a liquid panel, at the time the liquid crystal is injected into the liquid crystal sealing-in area from the liquid crystal injection opening, one of the transparent substrates of the pair of large-area substrates is not cut so that it remains a continuous large-area substrate. In the liquid crystal sealing-in step, the large-area transparent substrate is set in a device, and the liquid crystal is injected into all of the liquid crystal sealing-in areas by, for example, the dropwise injection method, followed by sealing of the liquid crystal injection openings with a sealing agent. Thereafter, the large-area transparent substrate is divided to form individual liquid crystal panels.

According to the method for producing a liquid crystal panel, after cutting out a portion where the liquid crystal injection opening is formed in one of the pair of opposing transparent substrates with the plurality of liquid crystal sealing-in areas, liquid crystal is injected into the liquid crystal sealing-in area, after which the pair of transparent substrates are cut into individual liquid crystal cells. For this reason, when the liquid crystal is injected into the liquid crystal sealing-in area from the liquid crystal injection opening, it is possible to set the large-area transparent substrate containing the plurality of liquid crystal panel sections in a device, and inject the liquid crystal into all of the panel sections with, for example, the dropwise injection method. As a result, the liquid crystal injection step is simplified in the producing method of the invention compared to the conventional producing method where the liquid crystal must be injected into each of the individual liquid crystal panels cut from the large-area transparent substrate. In addition, it no longer becomes necessary to use a special device for carrying out the liquid crystal injection step. Further, it is possible to produce liquid crystal panels of different standards with different sizes on exactly the same production line, thus making it unnecessary to prepare liquid crystal sealing-in devices in accordance with different liquid crystal panel standards.

Liquid crystal panels can roughly be divided into active type liquid crystal panels and simple matrix type liquid crystal panels. The active type liquid crystal panel is one that has an active element provided for every pixel or dot, in which during the writing period the active element is turned on to write data in terms of a voltage, while it is turned off during the other periods in order-to maintain the voltage. Examples of active elements include metal-insulator-metal (MIM) elements and thin film transistor (TFT) elements. On the other hand, the simple matrix type liquid crystal panel, which is of the type having drive signals applied thereto, does not have an active element for every pixel, but has scanning electrodes and data electrodes that intersect each other to form intersections that correspond to the pixels or dots.

The active type liquid crystal panel and the simple matrix type liquid crystal panel can both be produced by the method for producing a liquid crystal panel of the invention. When the invention is applied to the production of active-type liquid crystal panels, it is necessary to perform an active element forming step to form an active element group on the surface of the transparent substrate in order to connect the group with the transparent electrode formed on the transparent substrate surface for electrical conduction.

In another embodiment of the invention, the aforementioned pair of large-area substrates are glass substrates. In the above-described substrate removing step, a cut is formed on a surface of one of the glass substrates, and pressure is applied to the surface cut in order to further cut the cut portion, whereby a portion of one of the large-area substrates is removed. In this case, the cut is formed on the surface of one of the glass substrates by, for example, rotating a roller-like carbide blade as it presses against the surface of the substrate. The roller-like carbide blade is commonly called a scriber.

In still another embodiment of the invention, the seal forming step can be performed by forming a plurality of seals such that the liquid crystal injection openings are arranged in straight lines. In such a case, the substrate removing step can be performed by forming two linear cuts along the direction of arrangement of the plurality of liquid crystal injection openings disposed linearly, and removing a long-and-narrow portion bordered by the surface cuts from one of the large-area substrates.

In one embodiment, the long-and-narrow portion is removed from the transparent substrate in order to form an elongated groove in correspondence with the long-and-narrow portion in the transparent substrate. The liquid crystal injection openings of the liquid crystal scaling-in areas are exposed to the outside through the elongated groove. In the liquid crystal injection step, the liquid crystal is injected by dripping the liquid crystal at a location where the liquid crystal injection opening is exposed to the outside in the elongated groove. Thereafter, the large-area transparent substrate, which has not been cut, is cut to form individual liquid crystal panels.

In still another embodiment of the present invention, the substrate removing step can be performed by removing the long-and-narrow portion from the large-area substrate, while the panel sections on both sides of the long-and-narrow portion are shifted away from the long-and-narrow portion. After the substrate removing step, the seal hardening step is performed to harden the seal.

In the this embodiment, the long-and-narrow portion can be easily removed, since the panel sections on both sides of the long-and-narrow portion are shifted and separated from the long-and-narrow portion. In addition, the panel sections can be smoothly moved, since the seal has not yet been hardened.

In still another embodiment of the present invention, two surface straight-line cuts are formed to form tapering long-and-narrow portion that tapers from narrow to wide from the inner side to the outer side. According to this embodiment, the long-and-narrow portion can be easily removed from the transparent substrate, without moving the panel sections away from the long-and-narrow portion.

In still another embodiment of the invention, the seal forming step can be performed by forming two or more rows of a plurality of seals arranged such that the liquid crystal injection openings are disposed in straight lines, with the liquid crystal openings of adjacent seals of different rows facing each other. According to this embodiment, the liquid crystal-injection step can be performed to inject liquid crystal into two liquid crystal sealing-in areas at the same time by dripping the liquid crystal in a location where the liquid crystal injection openings face each other.

In still another embodiment of the invention, the substrate removing step can be performed by cutting out and removing a window-shaped portion, instead of an elongated groove, from one of the pair of large-area substrates. According to the this embodiment, this can limit the extent of flow of the liquid crystal.

In still another embodiment of the invention, the seal forming step can be performed by forming two or more rows of a plurality of seals arranged such that the liquid crystal injection openings are disposed in straight lines, with the liquid crystal injection openings of adjacent seals of different rows facing each other. In the substrate removing step, a window-shaped portion is cut out and removed from one of the pair of substrates such that the opposing pair of liquid crystal openings is exposed to the outside at the same time. According to this embodiment, it is possible to inject liquid crystal to two liquid crystal sealing-in areas at the same time by dripping the liquid crystal in one window-shaped portion, thus limiting the extent of flow of the liquid crystal.

In still another embodiment of the invention, a common liquid crystal panel has a connecting terminal section, extending out from around the liquid crystal sealing-in area, that contain a plurality of connecting terminals therein that are connected to the transparent electrode in the liquid crystal sealing-in area. A liquid crystal driving IC is either directly connected to the transparent electrodes or indirectly connected thereto through, for example, a wiring substrate in order to drive the transparent electrodes. A description will now be given of embodiments of a method for producing a liquid crystal panel that includes the formation of such a connecting terminal section.

According to the invention, there is provided a method for producing a liquid crystal by forming a plurality of liquid crystal sealing-in areas between a pair of large-area substrates, at least one of the substrates being a light-transmitting substrate, and dividing the plurality of liquid crystal sealing-in areas into separate areas, the method comprising:

(1) an electrode forming step in which transparent electrodes required to form a plurality of liquid crystal panels and a connecting terminal connected thereto are formed on a surface of each substrate of the pair of large-area substrates;

(2) a seal forming step performed on the electrode-formed surface of one of the pair of large-area substrates, in which a plurality of seals, each of which surround the transparent electrode required to form-one liquid crystal panel, are formed to form the plurality of liquid crystal sealing-in areas, liquid crystal injection openings are formed in each of the seals, and connecting terminal sections are formed around each of the liquid crystal sealing-in areas;

(3) a substrate bonding step in which the pair of large-area substrates are bonded together such that the transparent electrode of the one large-area substrate faces the transparent electrode of the other large-area substrates, with the seals interposed between the substrates;

(4) a substrate removing step in which a portion of one of the pair of large-area substrates bonded together is removed such that at least one of the liquid crystal injection openings and at least one of the connecting terminal sections are exposed to the outside;

(5) a liquid crystal sealing-in step in which liquid crystal is injected into the liquid crystal seating-in area through the liquid crystal injection opening exposed to the outside, and then the liquid crystal injection opening is sealed; and (6) a panel dividing step in which the pair of bonded large-area substrates are divided into separate liquid crystal panels after the liquid crystal injection.

According to this method, it is possible to open the liquid crystal injection opening and to expose the connecting terminal section to the outside, without completely cutting the large-area panel, since only a portion of one of the substrates is removed. Therefore, the liquid crystal injection step and liquid crystal panel electrical tests can be performed without completely cutting the large-area panel. Consequently, fewer liquid crystal panels need to be handled during the production process, and even when the individual liquid crystal panels vary in shape and size, a production line can be formed, without using, for example, jigs, containers, or devices, in correspondence with liquid crystal panels of different shapes and sizes, as long as the sizes of the large-area panels are standardized. As a result, it is possible to reduce production costs and production time, easily perform process control, and thus increase production efficiency. In addition, even when thin substrate pieces are produced when part of the substrate is being removed, the large-area panel can be washed without cutting it, thereby preventing the production of defective products due to adhesion of the thin glass pieces. As a result, product yield can also be increased.

In an embodiment of the above-described method of producing a liquid crystal panel, the substrate removing step comprises two separate steps of removing part of the large-area substrate such that at least one of the liquid crystal injection openings is exposed to the outside, and removing part of the large-area substrate such that at least one of the connecting terminals is exposed to the outside.

According to the method, the above-described removing steps are performed separately, so that the liquid crystal injection opening and the connecting terminal section can be more freely placed in a larger number of locations, and thus to increase the processing efficiency of the large-area panel having a plurality of liquid crystal panels with substantially the same structure arranged thereon.

In another embodiment, an electrical test is performed through the connecting terminal section exposed to the outside between the liquid crystal sealing-in step and the panel dividing step.

In another embodiment, the liquid crystal injection opening and the connecting terminal section can be exposed to the outside by removing the long-and-narrow portions of the pair of large-area substrates which intersect each other. According to the method, since the long-and-narrow portions to be removed are formed on the pair of substrates so as to intersect each other, the large-area panel is formed into a structure with parts that are parallel to and cross each other, thus allowing a larger area to be removed from the substrate since the area of removal extends in two directions. Therefore, less constraints are placed on the location and structure of the individual liquid crystal panels in the large-area panel, and, in addition, a smaller number of portions need to be removed with respect to the number of liquid crystal panels arranged, thereby simplifying the substrate removing step and thus allowing the step to be performed in a shorter time.

In another embodiment, the pair of large-area substrates are glass substrates. A cut is formed on a surface of one of the glass substrates, and pressure is applied to the surface cut in order to cut the cut portion, whereby part of one of the large-area substrates is removed. This method is a more realistic processing method and more easier to perform.

In this embodiment, it is preferable to remove part of the large-area substrate with a gap formed around the portion to be removed. Since part of the substrate is removed with a gap between the flanks formed by the cutting, the flanks rub against each other less frequently due to contact, thereby producing a smaller number of thin substrate pieces from the flanks during cutting of the substrate.

In addition, it is preferable to form tapering surface cuts such that the portion to be removed tapers from narrow to wide from the inner side to the outer side, when removing part of the substrate by forming the surface cut. Since the flanks formed by the cutting taper from narrow to wide toward the surface substrate, it becomes easier to cut the portion of the substrate to be removed, and reduce the number of thin substrate pieces produced from the flanks during the cutting of the substrate.

In still another embodiment, an electrical test can be performed after connecting at least one electrical member, such as, for example, an integrated circuit chip or a flexible wiring plate, to a plurality of connecting terminals of a connecting terminal section. According to the method, it is possible to perform such tests as a liquid crystal display driving test, without completely cutting the large-area panel, with the electrical member connected to the individual liquid crystal panels, thus further increasing the testing efficiency.

DETAILED DESCRIPTION OF PREFERRED EMBODIMENTS

Figure 11:
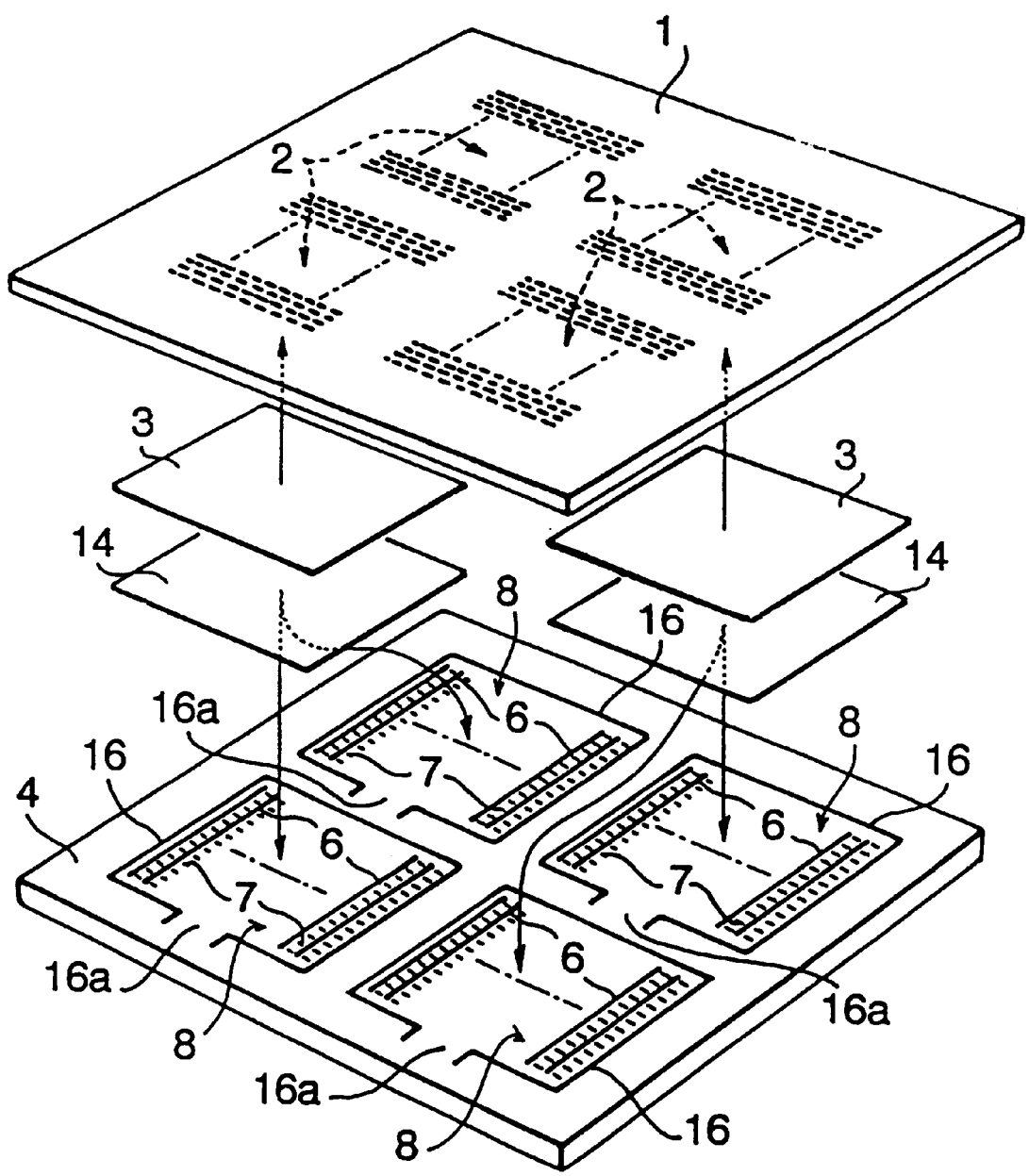
FIG. 11 is an exploded perspective view illustrating the substrate forming step and the substrate bonding step.

Referring to FIG. 11, indium tin oxide (ITO) is deposited by sputtering onto one of the surfaces (the lower surface in the figure) of an opposing substrate 1 formed from glass base material that transmits light, followed by patterning to form a plurality of transparent electrodes 2. The number of the transparent electrodes 2 used depends on the number of liquid crystal panels to be form. In this embodiment, the number of transparent electrodes 2 required to form four liquid crystal panels is used. Thereafter, an orientation film 3 is form on each transparent electrode.

On the other hand, a plurality of linear and parallel wiring layers 6 are formed on an element substrate 4 formed from glass base material that transmits light, followed by formation of a plurality of transparent electrodes 7 between the wiring layers 6, whereby element row groups 8 are formed. The number of the element row groups 8 used also depends on the number of liquid crystal panels to be formed. In this embodiment, the number of element row groups 8 required to form four liquid crystal panels are used.

Figure 12:
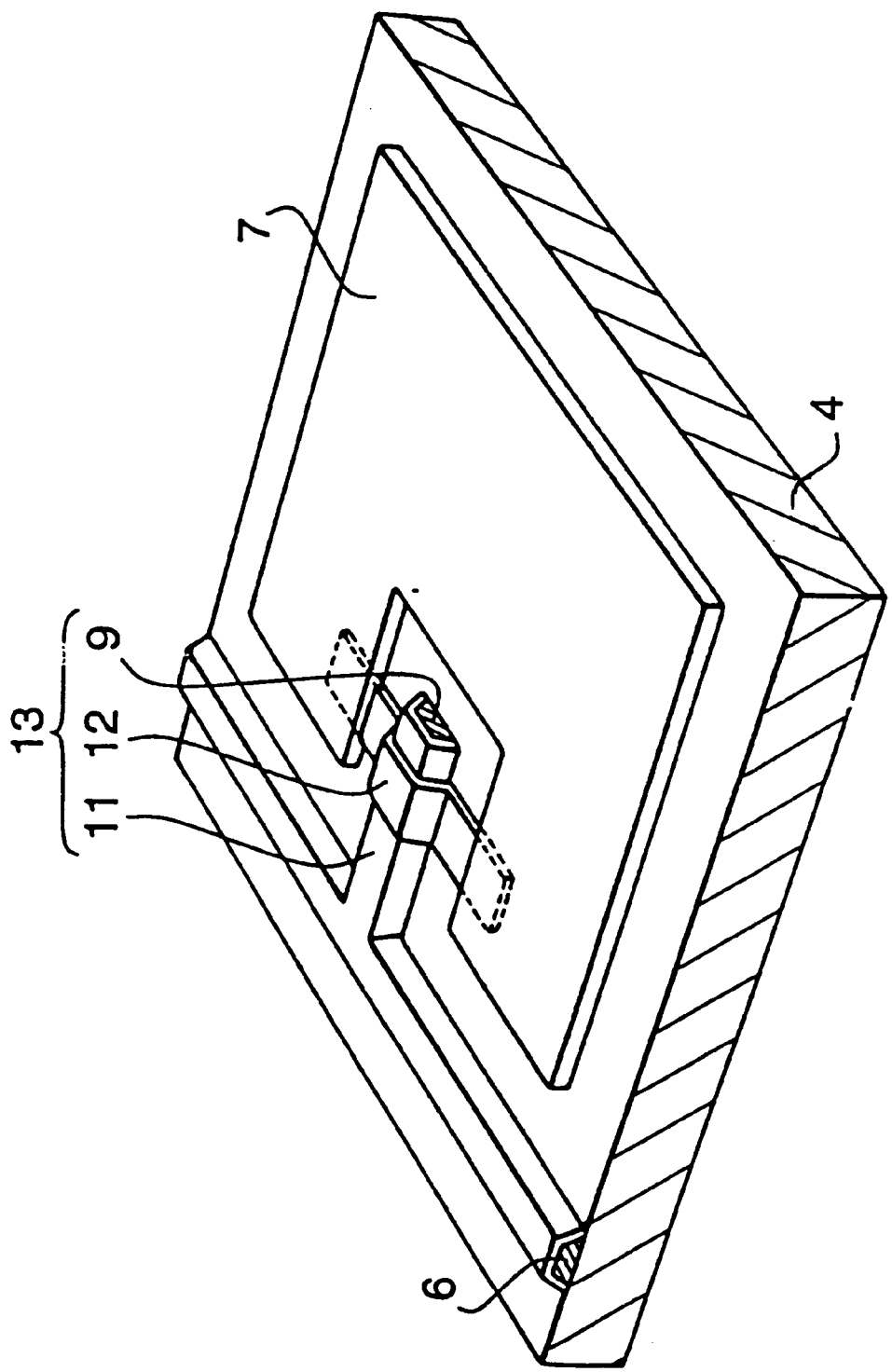
FIG. 12 is a schematic view of an MIM element shown as an example of an active element.

The plurality of transparent electrodes 7 are disposed in a matrix arrangement in each of the element row groups 8, with each transparent electrode 7 forming one pixel. FIG. 12 is an enlarged view showing the structure of the vicinity of one transparent electrode 7. In the structure, tantalum (Ta) is used to form a willing layer 6 and an MIM first electrode 9 on the element substrate 4, followed by formation of an anodic oxidation film 11 on the first electrode 9 and formation of an MIM second electrode 12 on the anodic oxidation film 11 using chromium (Cr). Accordingly, an MIM element 13 is formed as an active element by the first electrode 9, the anodic oxidation film 11, and the second electrode 12. Thereafter, using ITO, the transparent electrode 7 is formed on the front ends of the second electrode 12, with one transparent electrode 7 forming a pixel. Then, the orientation film 14 is formed on the transparent electrode 7.

Thereafter, by screen printing, a seal 16 is formed around each element row group 8 formed on the surface of the element substrate 4 with the transparent electrodes 7, that is at the outer edge of each liquid crystal panel. A portion of each seal 16 has an opening 16a serving as a liquid crystal injection opening.

Figure 1:
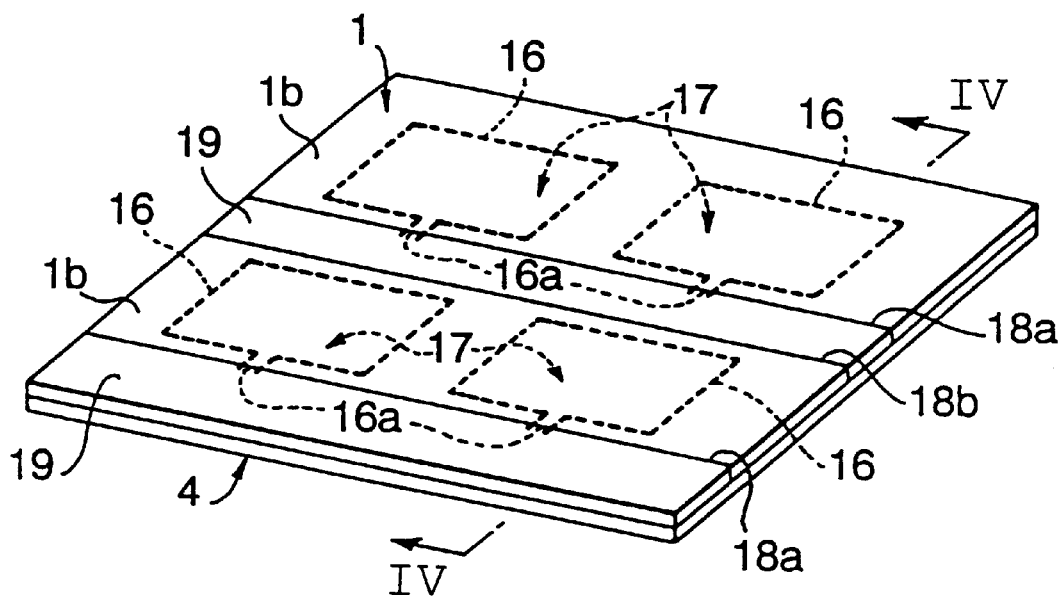
FIG. 1 is a perspective view illustrating a main step in an embodiment of a liquid crystal panel producing method in accordance with the invention.

After the opposing substrate 1 and the element substrate 4 have been processed in the above-described manner, a bead-like spacer is spread on the electrode surfaces of either one of the substrates and the electrode surfaces of each of the substrates 1 and 4 are disposed facing each other in order to bond the substrates 1 and 4 together, resulting in formation of a large-area empty panel, as shown in FIG. 1. In FIG. 1, the area 17 surrounded by the seal 16 is an area where liquid crystal is filled in.

Figure 4:
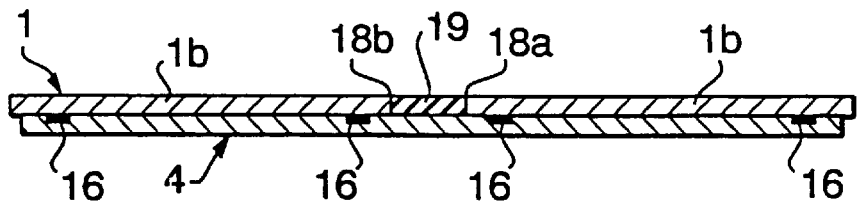
FIG. 4 is a section taken along line IV—IV of FIG. 1.

Thereafter, a linear cut or groove 18a is scribed on the surface of the opposing substrate 1 so as to cross each liquid crystal injection opening 16a. Another linear cut 18b is formed parallel to the linear groove 18a. The linear cuts 18a and 18b can be scribed by a scriber with a roller-like cutting blade. FIG. 4 is a section taken along line IV—IV of FIG. 1, in which a long-and-narrow portion 19 is formed between the two surface cuts 18a and 18b, with one panel section 1b of the opposing substrate 1 formed on each side of the long-and-narrow portion 19.

Figure 5:
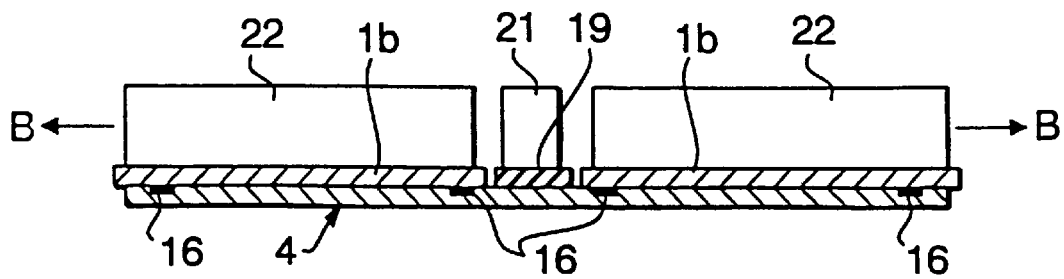
FIG. 5 is a perspective view illustrating still another main step in the embodiment of FIG. 1.
Figure 6:
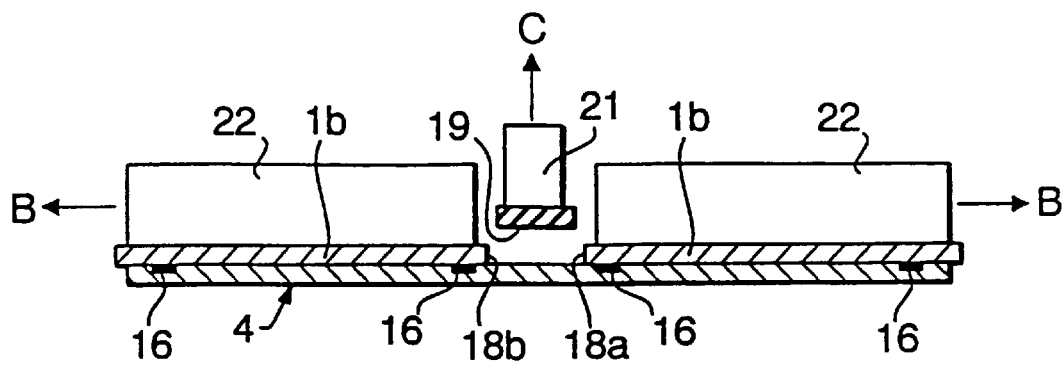
FIG. 6 is a section illustrating a step following the step of FIG. 5.

Then, as illustrated in FIG. 5, a separating tool 21 with a vacuum adsorption portion is contacted with the surface of the narrow-and-long portion 19 in order to adsorb the narrow-and-long portion 19 by vacuum adsorption using the separating tool 21. In the same way, the separating tools 22, each with a vacuum adsorption portion, are contacted with the individual panel sections 1b and 1b in order to adsorb the panel sections by vacuum adsorption using the separating tools. Then, the panel sections 1b and 1b are slid horizontally in the directions of arrow B, respectively, away from the narrow-and-long portion 19 by about 50 to 100 Am, forming gaps between both sides of the narrow-and-long portion. As shown in FIG. 6, with the narrow-and-long portion separated from the panel sections 1b and 1b, the separating tool 21 is moved upward and away from the panel sections 1b and 1b, that is the opposing substrate 1, whereby the narrow-and-long portion is removed from the opposing substrate 1. At this time, both of the panel sections 1b can be slid smoothly, since the seals 16 have not yet hardened.

Figure 2:
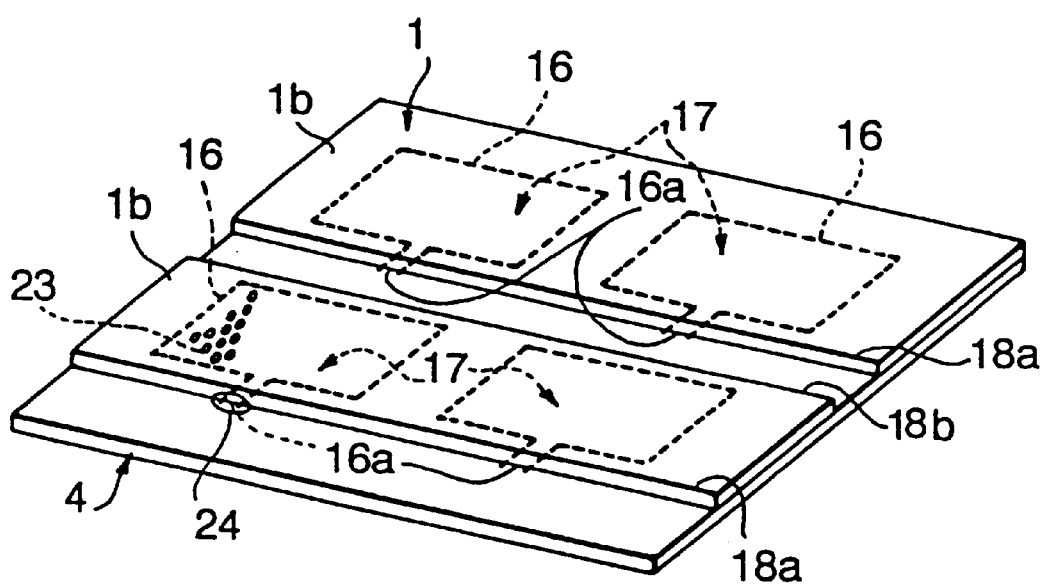
FIG. 2 is a perspective view illustrating another main step in the embodiment.

Thereafter, both of the panel sections 1b are moved back to their original positions by moving the separating tools 22 back to their original positions, after which the seals 16 are irradiated with ultraviolet light and thereby hardened. Accordingly, as shown in FIG. 2, a large-area empty panel is formed, with the narrow-and-long portion 19 removed. In the empty panel, the liquid crystal injection openings 16a of each of the liquid crystal injection areas 17 are exposed to the outside as a result of the removal of the long-and-narrow portion 19.

Figure 3:
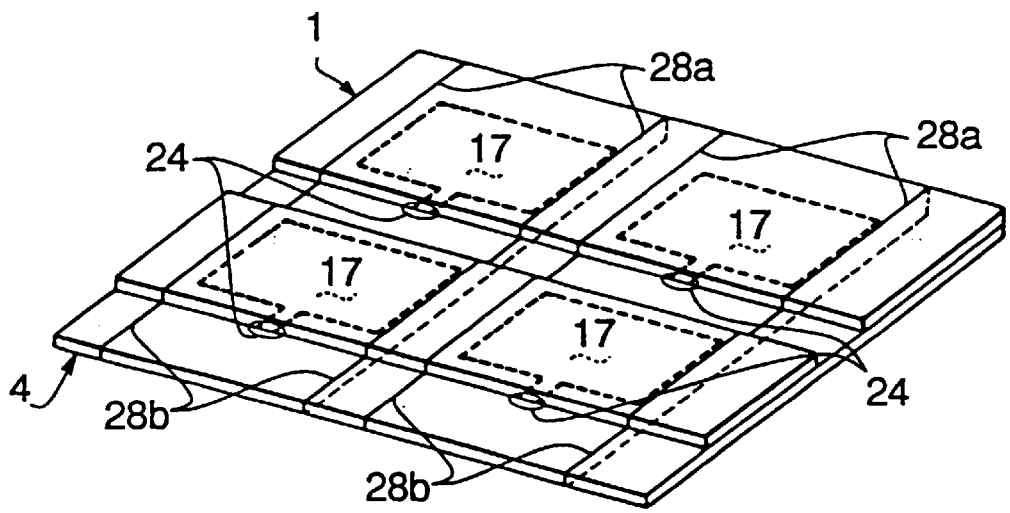
FIG. 3 is a perspective view illustrating another main step in the embodiment.

Thereafter, in a vacuum, liquid crystal is dripped in the vicinity of each of the liquid crystal injection openings 16a, and is injected into each of the liquid crystal injection areas 17 as liquid crystal 23 in an atmosphere. This method of liquid crystal injection is commonly called the dropwise injection method. Thereafter, a sealing agent 24 is used to seal each liquid crystal injection opening, as a result of which a large-area liquid crystal panel is formed. As shown in FIG. 3, in correspondence with the size of one liquid crystal panel, grooves 28a are then scribed in the opposing substrate 1, followed by formation of grooves 28b in the element substrate 4. The predetermined number of liquid crystal cells (four in this embodiment) are produced by cutting the one large-area panel along the-scribed grooves.

According to this embodiment, at the time the liquid crystal is injected from each liquid crystal injection opening 16a into each liquid crystal sealing-in area 17, in the liquid crystal injection step, the large-area liquid crystal panel containing the plurality of panel sections when empty can be set in a predetermined liquid crystal sealing-in device in order to inject liquid crystal into all of the panel sections by the dropwise injection method. Therefore, compared to the conventional liquid crystal panel producing method in which liquid crystal is injected into each of the empty panels after cutting of the large area empty panel into the individual empty panels, the liquid crystal injection step becomes less complicated, thus eliminating the need for a special liquid crystal sealing-in device for the step. In addition, it is possible to produce liquid crystal panels of various sizes on exactly the same manufacturing line, producing liquid crystal panels of different standards, without having to prepare liquid crystal sealing-in devices in correspondence with the various standards of the liquid crystal panels.

Although in the foregoing description, the opposing substrate 1, rather than the other of the pair of substrates, was the first one to be cut to expose each of the liquid crystal injection opening 16a to the outside, the element substrate may be the first one to be cut.

Although in the foregoing description, the MIM element 13 was formed as the active element, a TFT element may be formed as the active element. In addition, it is obvious that the invention can be applied when preparing a simple matrix-type liquid crystal panel. In the matrix-type liquid crystal panel, which is a panel that does not contain an active element for each pixel, the intersection portion of the scanning electrode and the data electrode correspond to a pixel or dot, and a drive signal is directly applied to these electrodes.

Figure 7:
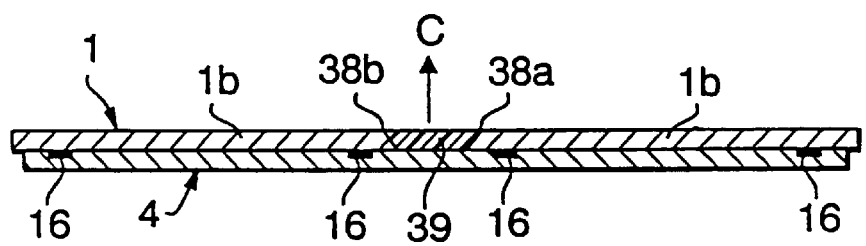
FIG. 7 is a perspective view illustrating a main step in another embodiment of a liquid crystal panel producing method in accordance with the invention.

FIG. 7 is a view illustrating a main step of a liquid crystal panel producing method of another embodiment in accordance with the invention. The embodiment differs from the embodiment discussed above in that the inner side (lower side in the figure) of the narrow-and-long portion 39 of the opposing substrate 1 is narrower than the outer side (top side in the figure) of the narrow-and-long portion, so that the scribed grooves or the surface cuts 38a and 38b have inclined or tapered faces. The other production steps are the same as those of The embodiment of FIG. 2, so that they will not be described below.

In this embodiment, since the scribed grooves 38 and 38b are tapered, the narrow-and-long portion 39 can be easily and reliably removed from the opposing substrate 1 by moving the narrow-and-long portion 39 in the direction of arrow C, thus making it unnecessary to horizontally slide the panel portions 1b and 1b on both sides of the narrow-and-long portion 39.

Figure 8:
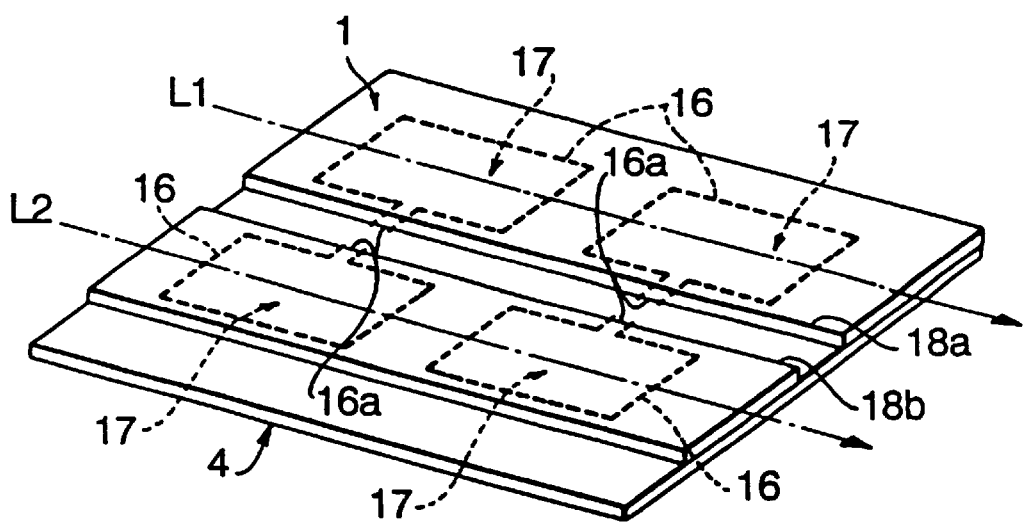
FIG. 8 is a perspective view illustrating a main step in still another embodiment of a liquid crystal panel producing method in accordance with the invention.

FIG. 8 is a view showing a main step in a liquid crystal panel producing method of another embodiment in accordance with the invention. This embodiment differs from the embodiment of FIG. 2 in the following two ways. The first difference is that when two of the four seals 16 are arranged in a row to form a first row L1 and the remaining two seals 16 are arranged in a row to form a second row L2, so that each seal of L1 faces the seal of L2 adjacent thereto, the liquid crystal injection openings 16a of each seal 16 in L1 and the seal 16 in L2 adjacent thereto face each other. The second difference is that the two scribed grooves 18a and 18b are formed so as to cross each of the liquid crystal injection openings 16a of the facing seals 16. The other production steps are the same as those in the foregoing description, so that they will not be hereunder described.

According to this embodiment, it is possible to halve the number of man hours needed for the task of dripping the liquid crystal in the liquid crystal sealing-in step by simultaneously dripping liquid crystal into the pair of opposing liquid crystal sealing-in areas 17.

Figure 9:
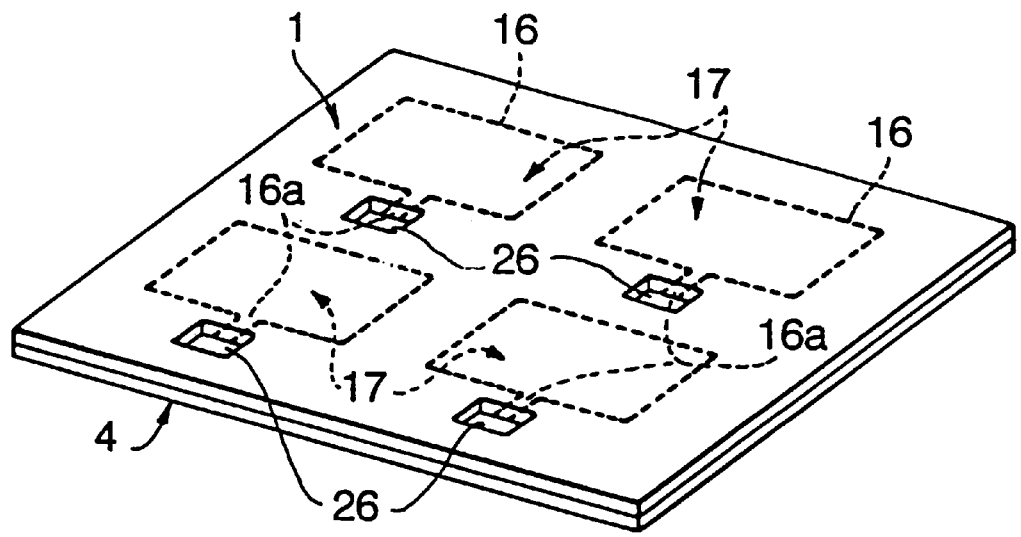
FIG. 9 is a perspective view illustrating a main step in still another embodiment of a liquid crystal panel producing method in accordance with the invention.

FIG. 9 is a view showing a liquid crystal panel producing method of another embodiment in accordance with the invention. This embodiment of FIG. 2, a narrow-and-long portion was cut out and removed from the opposing substrate in order to expose the liquid crystal injection openings 16a of the liquid crystal sealing-in areas 17 to the outside. In contrast to this, in the embodiment of FIG. 9, window-shaped portions 16 are cut out and removed from the opposing substrate 1 in correspondence with the liquid crystal injection openings 16a of the liquid crystal sealing-in areas 17. The window-shaped portions may be, for example, square-shaped, rectangular, or circular. The other production steps are the same as those of the embodiment of FIG. 2, so that they will not be hereunder described.

When a narrow-and-long portion is removed from the opposing substrate 1, as shown in FIG. 2, the liquid crystal, dripped at the liquid crystal injection opening 16a, may flow out along the outer periphery of the liquid crystal seal 16, but the window-shaped portions do not allow the liquid crystal to flow out in such a way, thus preventing the liquid crystal from being wasted.

Figure 10:
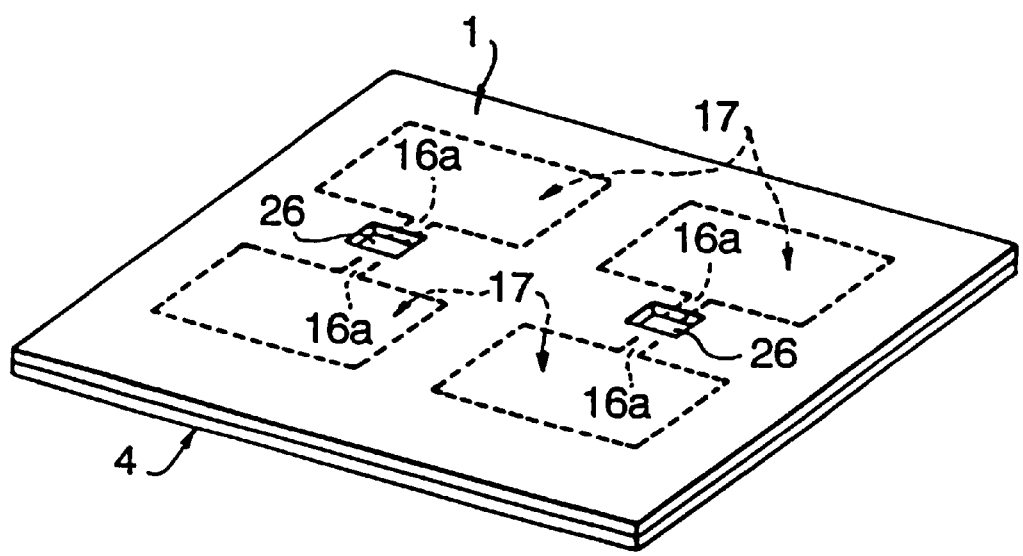
FIG. 10 is a perspective view showing a main step in still another embodiment of a liquid crystal panel producing method in accordance with the invention.

FIG. 10 is a view showing a liquid crystal panel producing method of another embodiment in accordance with the invention. This embodiment differs from embodiment of FIG. 2 as follows:

(1) The liquid crystal injection openings 16a of the liquid crystal sealing-in areas 17 are in different seal rows, forming pairs of openings, facing each other, and (2) Window-shaped portions are cut out and removed from the opposing substrate 1 in the form of common window portions 26 that allow the opposing liquid crystal injection openings 16a of each pair of the openings 16a to be exposed to the outside at the same time. The other producing steps are the same as those of the embodiment of FIG. 2, so that they will not be described below.

In the this embodiment, a liquid crystal is dripped into the window-shaped portions 26 in a vacuum, and then the liquid crystal is injected into the liquid crystal-sealing-in areas 17 in an atmosphere, followed by sealing of the liquid crystal injection openings 16a with a sealing agent. Thereafter, the liquid crystal panel sections are cut one at a time from the liquid crystal panel. According to the embodiment, it is possible to halve the number of steps required for the liquid crystal sealing-in step, since liquid crystal can be injected into two liquid crystal sealing-in areas 17 using only one window-shaped portion 26.

Figure 28:
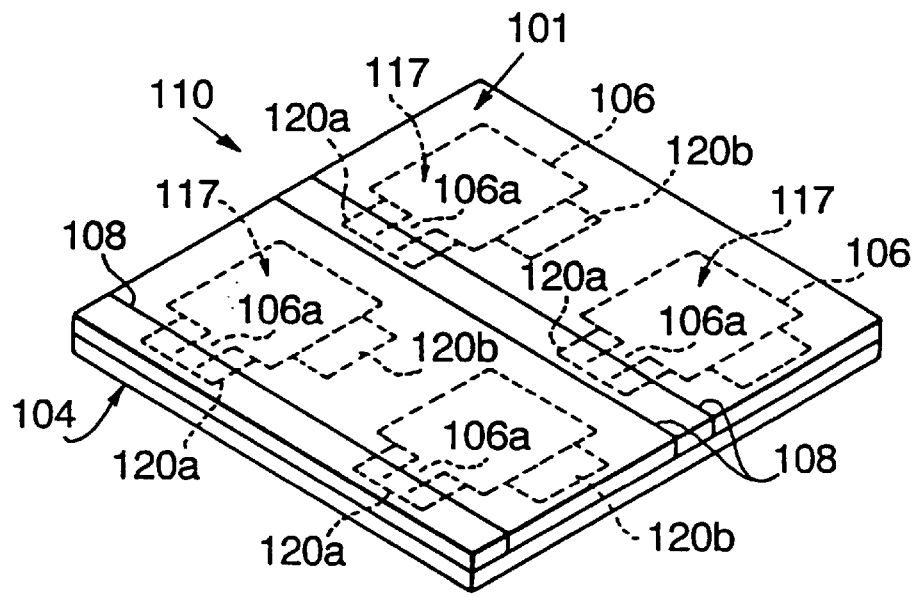
FIG. 28 is a perspective view showing a main step of a conventional liquid crystal panel producing method.
Figure 29:
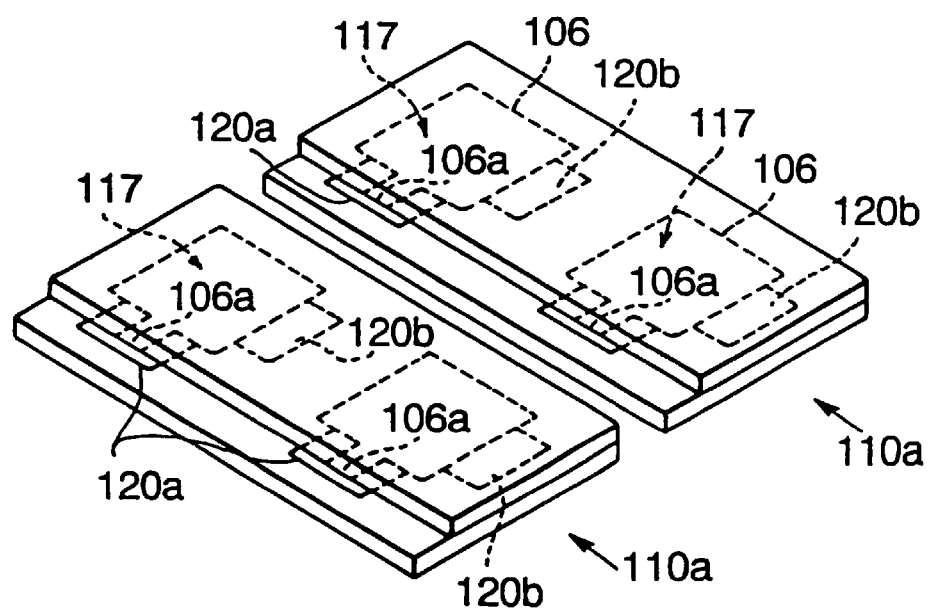
FIG. 29 is a perspective view illustrating another main step in the conventional liquid crystal panel producing method.
Figure 30:
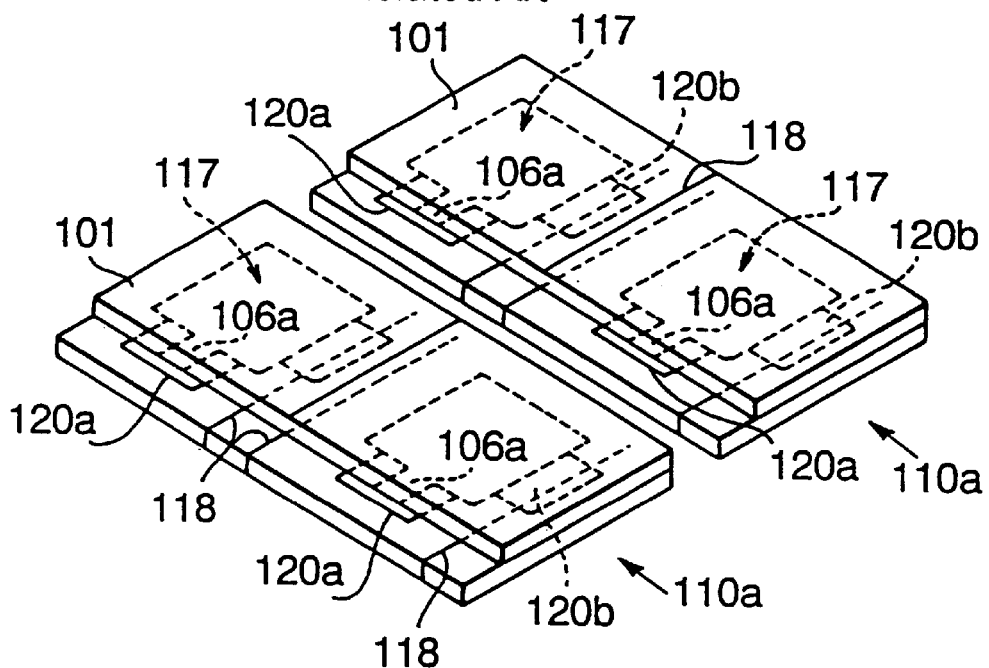
FIG. 30 is a perspective view illustrating still another main step of the conventional liquid crystal panel producing method.
Figure 31:
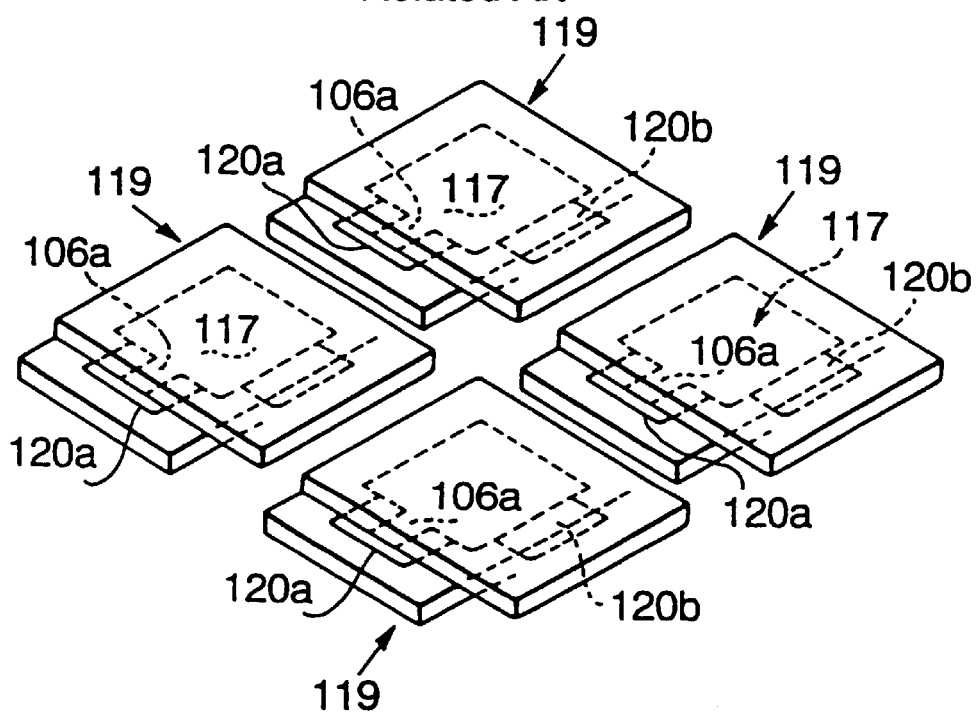
FIG. 31 is a perspective view illustrating still another main step of the conventional liquid crystal panel producing method.

As described with reference to FIG. 28, in a commonly used liquid crystal panel, a connecting terminal section is formed around the liquid crystal scaling-in area so as to protrude out from the area, and the plurality of connecting terminals formed within the connecting terminal section are connected to the transparent electrodes in the liquid crystal sealing-in areas. An IC for driving the liquid crystal is either connected directly to each connecting terminal or indirectly connected to each connecting terminal through, for example, a wiring substrate in order to drive the transparent electrodes.

Although, the aforementioned connecting terminal was not discussed in the previous embodiments described with reference to FIGS. 1 to 10, this does not mean that such a connecting terminal is not used in each of the previous embodiments. The connecting terminal was not shown in the figures and was not described only for the sake of-simplifying the description. More specifically, FIGS. 1 to 10, do not show the connecting terminal.

In the description of the liquid crystal panel producing method of Embodiment 6 below, the connecting terminal will also be discussed. More specifically, another embodiment is carried out, for example, by following the steps shown in FIG. 19.

Figure 13:
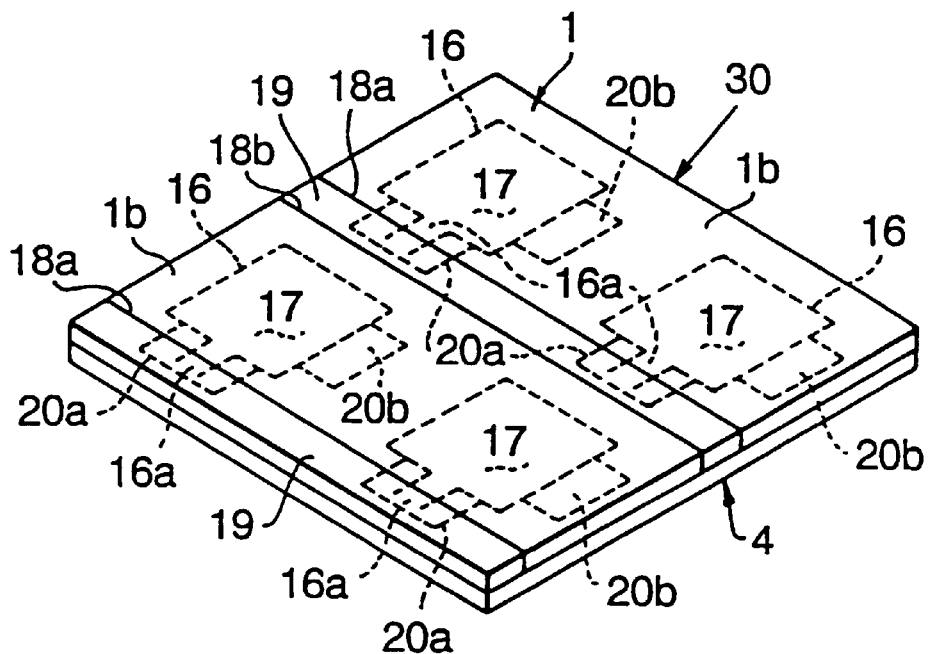
FIG. 13 is a perspective view illustrating a main step of still another embodiment of a liquid crystal panel producing method in accordance with the invention.
Figure 14:
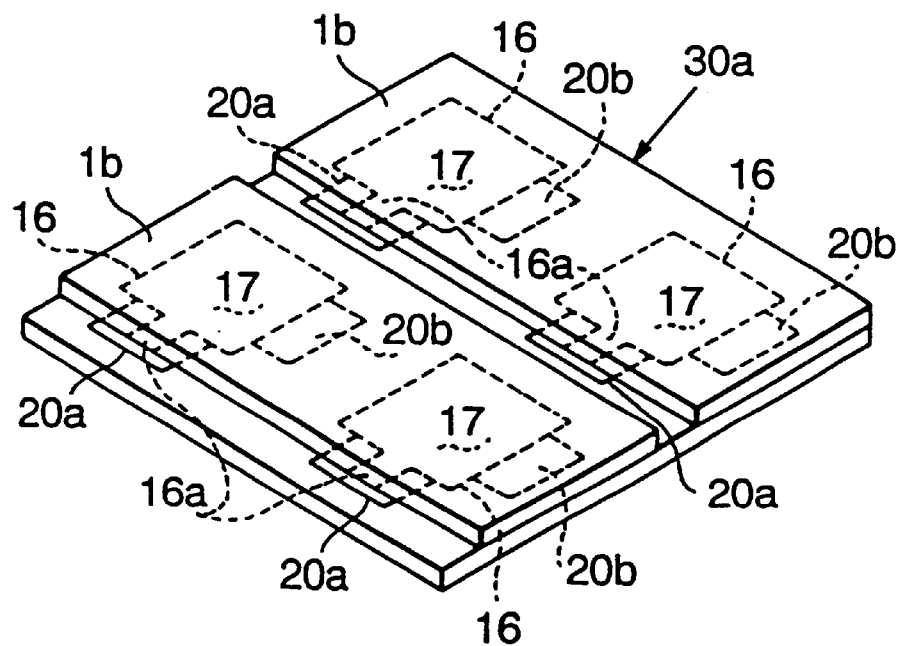
FIG. 14 is a perspective view illustrating another main step in the embodiment.

In Step P1, wirings, electrodes, active elements, orientation films, and so forth are formed on the inner faces of transparent substrates. More specifically, as shown in FIG. 13, wiring layers and transparent electrodes (not shown) are formed in a predetermined pattern on the inner faces of transparent substrates made of such material as glass, that is on the inner faces of substrates 1 and 4 that transmit light. The active element, such as a metal-insulator-metal (MIM) element or a thin film transistor (TFT) element, may be formed on the surface of either one of the transparent substrates 1 and 4, when necessary.

In general, the substrate onto which the active element is formed is the transparent substrate 4 to which is also formed a connecting terminal section 20a described later. A plurality of connecting terminals are formed in the connecting terminal section 20a. The wiring layer pattern formed on the substrate 4 is connected to the connecting terminals in its associated connecting terminal section 20a. A connecting terminal section 20b is formed on the opposing substrate 1 that opposes the substrate 4. A plurality of connecting terminals, formed in the connecting terminal section 20b, are connected to the wiring layer formed on the opposing substrate 1.

An orientation film, formed from polyimide resin or other material that orients the liquid crystal, is applied to the inner surface of either the opposing substrate 1 or the substrate 4, followed by rubbing in a predetermined direction.

Figure 19:
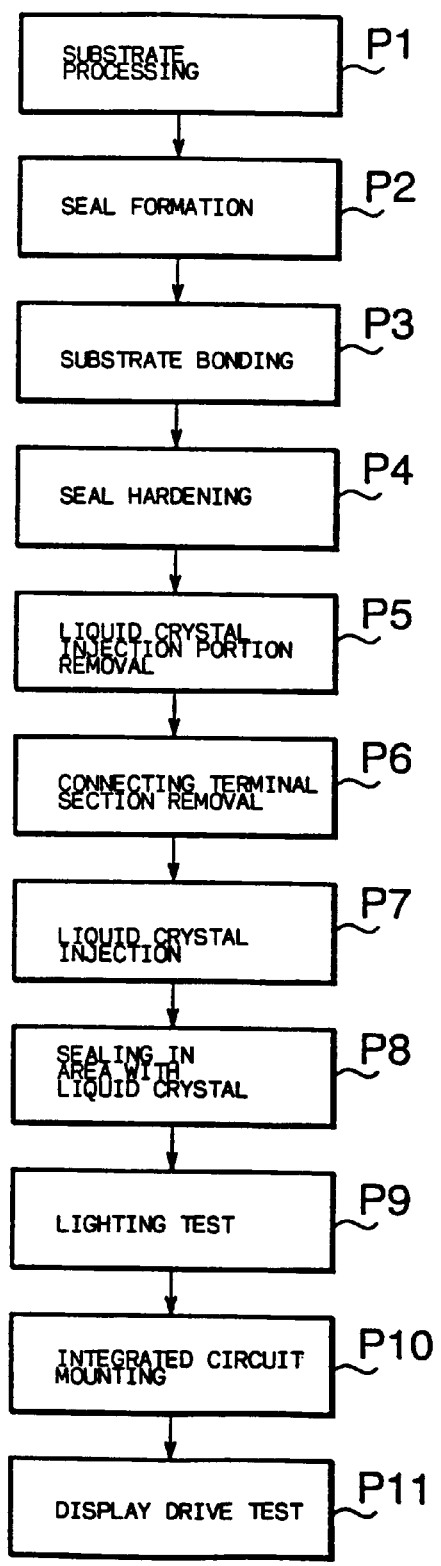
FIG. 19 is a flow chart of a liquid crystal panel producing method in accordance with the invention.

Then, in Step P2 of FIG. 19 in which a seal is formed, a seal 16, composed of ultraviolet-curing resin, is screen-printed onto the inner surface of either one of the opposing substrate 1 and the substrate 4 so as to border a liquid crystal sealing-in area 17. A liquid crystal injection opening 16a is formed in the part of the liquid crystal sealing-in area 17 not screen-printed with the seal 16.

Thereafter, in Step P3 of FIG. 19 in which the substrates are bonded together, a spacer 16 for maintaining the liquid crystal layer to a uniform thickness is spread on the inner surface of either the opposing substrate 1 or the substrate 4, whichever has the seal 16 screen-printed thereon. Then, the opposing substrate 1 and the substrate 4 are bonded together, with the seal 16 disposed therebetween.

In Step P4, the seal is hardened by irradiating it with ultraviolet light, while the distance between the opposing substrate 1 and the substrate 4, that is the size of the cell gap is maintained with high precision, whereby a large area empty panel 30, shown in FIG. 13, is produced. The liquid crystal sealing-in areas 17, and the connecting terminal sections 20a and 20b associated with their respective liquid crystal sealing-in areas 17 are formed on the large-area empty panel 30 in a predetermined arrangement. FIG. 13 shows a simplified large-area empty panel 30 with four liquid crystal sealing-in areas 17 arranged vertically and oriented in the same direction. The liquid crystal injection openings 16a are disposed on the same side of their respective liquid crystal sealing-in areas 17.

Figure 23:
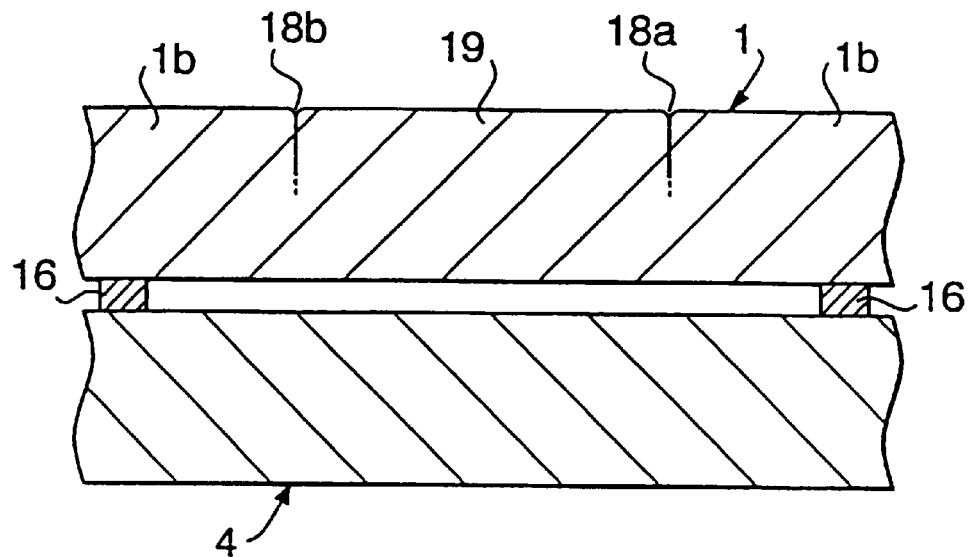
FIG. 23 is a section illustrating an example of the substrate removing step.

In Step P5 of FIG. 19 in which the liquid crystal injection openings are removed, two cuts 18a and 18b are scribed on the outer surface of the opposing substrate 1 using a scriber along the direction of arrangement of the liquid crystal injection openings 16a of the liquid crystal sealing-in areas 17. The scribed cut 18a crosses each of the liquid crystal filling opening 16a. As shown in FIG. 23, the scribed cuts 18a and 18b are formed parallel to each other so as to be spaced apart by a predetermined distance.

Figure 24:
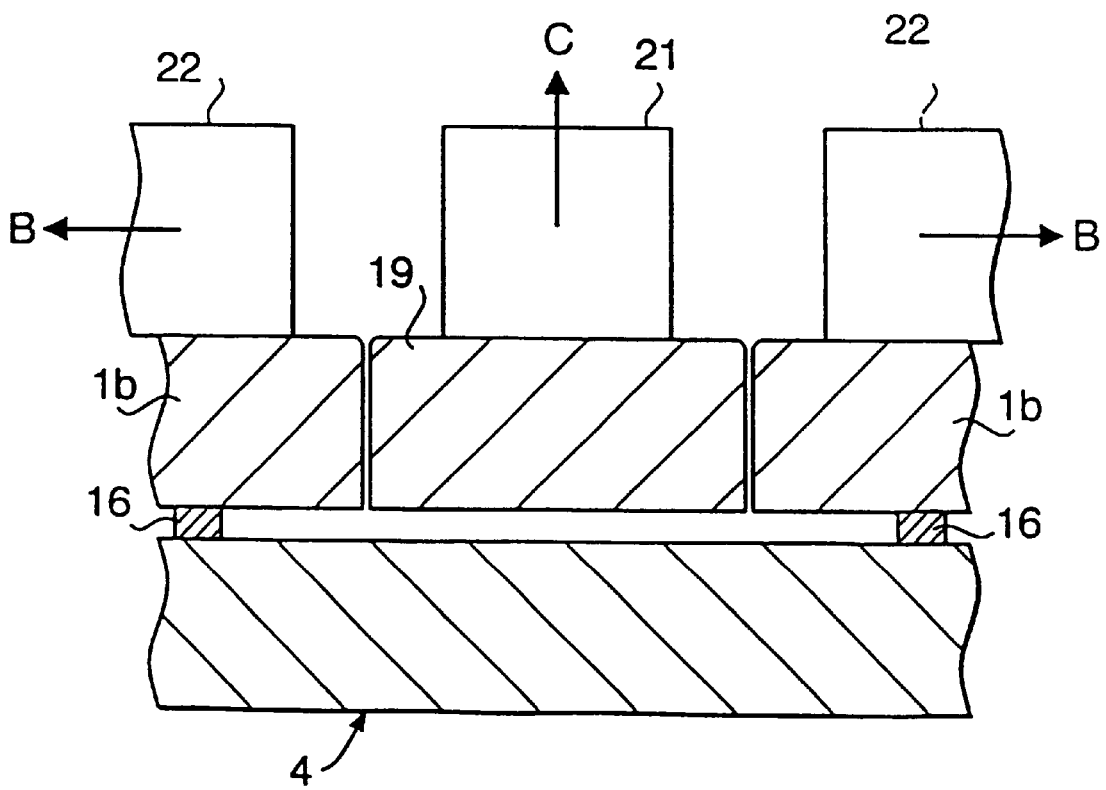
FIG. 24 is a section illustrating a step following the step of FIG. 23.

The opposing substrate 1 is cut along the scribed cuts 18a and 18b by applying pressure along the portion of the surface of the opposing electrode 1 with the scribed cuts 18a and 18b, using, for example, a roller, or by adsorption using a separating tool, which is described later. As shown in FIG. 24, a separating tool 21 with a vacuum adsorption section is used to adsorb the surface of a long-and-narrow portion 19 bordered by the scribed cuts 18a and 18b on the opposing substrate 1. On the other hand, separating tools 22 each with a vacuum adsorption section are used to adsorb the surfaces of the panel sections 1b and 1b disposed on both sides of the long-and-narrow section 19. During adsorption, the long-and-narrow portion 19 and the panel sections 1b and 1b are subjected to an external force, causing the long-and-narrow portion 19 and the panel sections 1b to split and separate.

In this condition, the left and right separating tools 22 and 22 are used to slide the panel sections 1b and 1b about 50 to 100 Am outward in the direction of arrow B so as to intersect the direction of the scribed cuts 18a and 18b, thus forming gaps at the flanks of the long-and-narrow portion 19. Alter the panel sections 1b and 1b are slightly spaced apart from the long-and-narrow portion 19, the separating tool 21 removes the long-and-narrow portion 19 by raising it upward. Accordingly, it is possible to prevent pieces of glass from being produced during separation of the long-and-narrow portion 19 from the panel sections 1b and 1b, when gaps are formed at the flanks.

As can be understood from the foregoing description, removing the long-and-narrow portion 19 from the large-area empty panel 30 (FIG. 13) produces a large-area empty panel 30a in which long-and-narrow portions have been removed from the opposing substrate 1. Removal of the long-and-narrow portions 19 causes the liquid crystal injection openings 16a of the liquid crystal sealing-in areas 17, as well as the connecting terminal sections 20a to be exposed to the outside at the same time.

Figure 15:
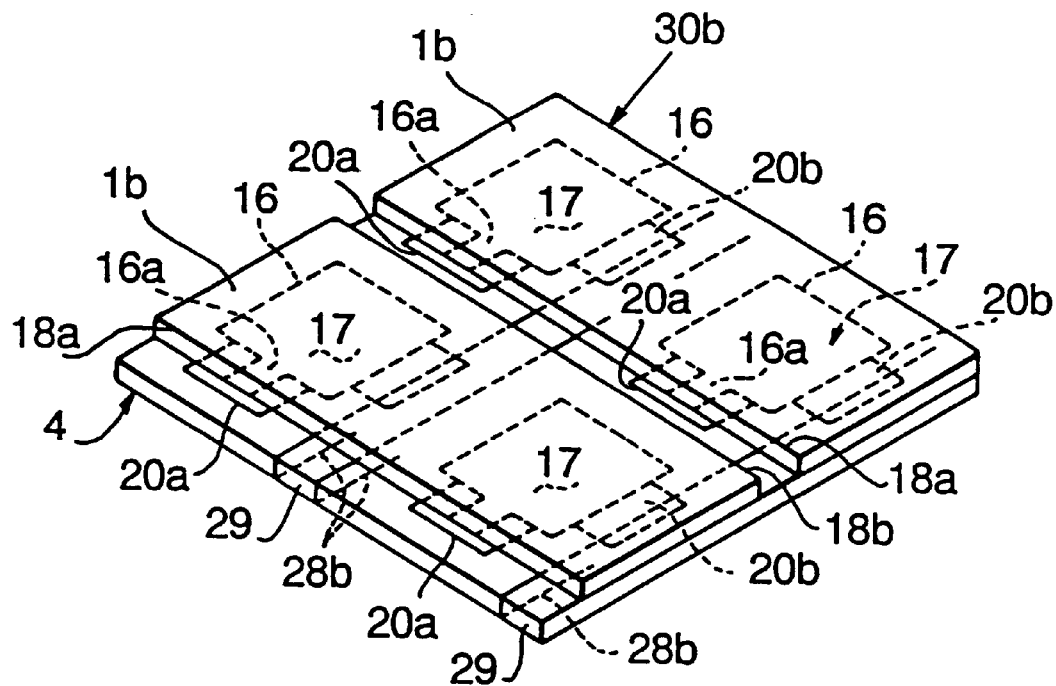
FIG. 15 is a perspective view of still another main step in the embodiment.
Figure 16:
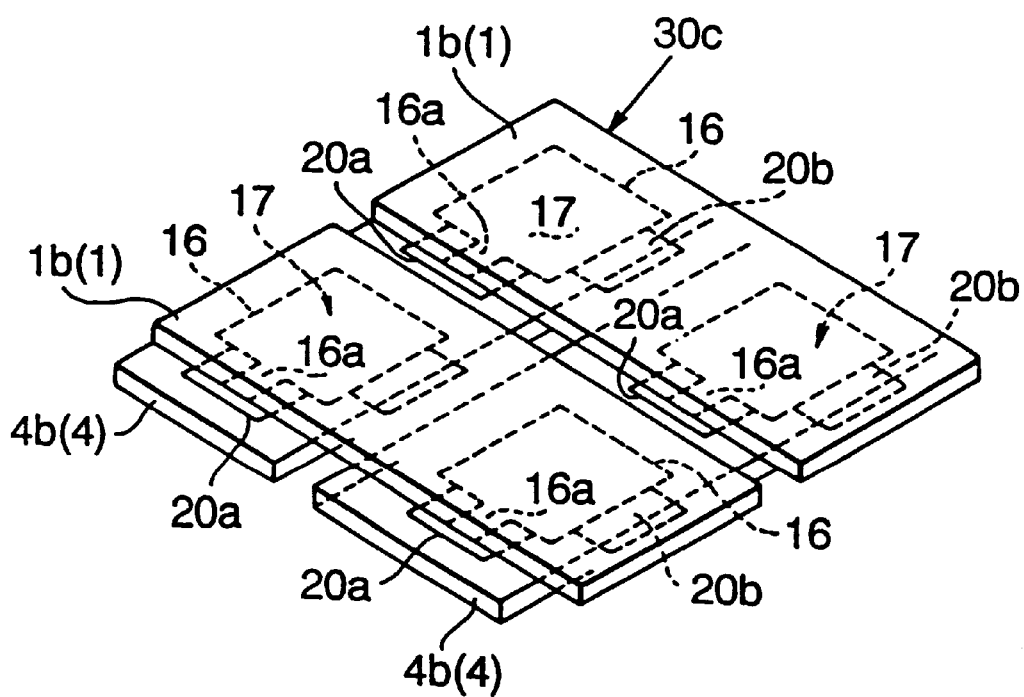
FIG. 16 is a perspective view of still another main step in the embodiment.

In Step P6 of FIG. 19 in which the connecting terminal sections are removed, a plurality of cuts 28b are formed on the surface of the substrate 4 in a direction perpendicular to the scribed cuts 18a and 18b on the opposing substrate 1 side, as shown in FIG. 15. Long-and-narrow portions 29, bordered by the scribed cuts 28b, are removed from the substrate 4. When they are removed, a large-area empty panel 39c, as shown in FIG. 16, is formed, in which portions of the substrate 4 have been removed to form panel sections 4b and 4b. In the empty panel 30c, the connecting terminal sections 20b formed on the inside face of the opposing substrate 1 are exposed to the outside by the removal of the long-and-narrow portions 29.

Figure 17:
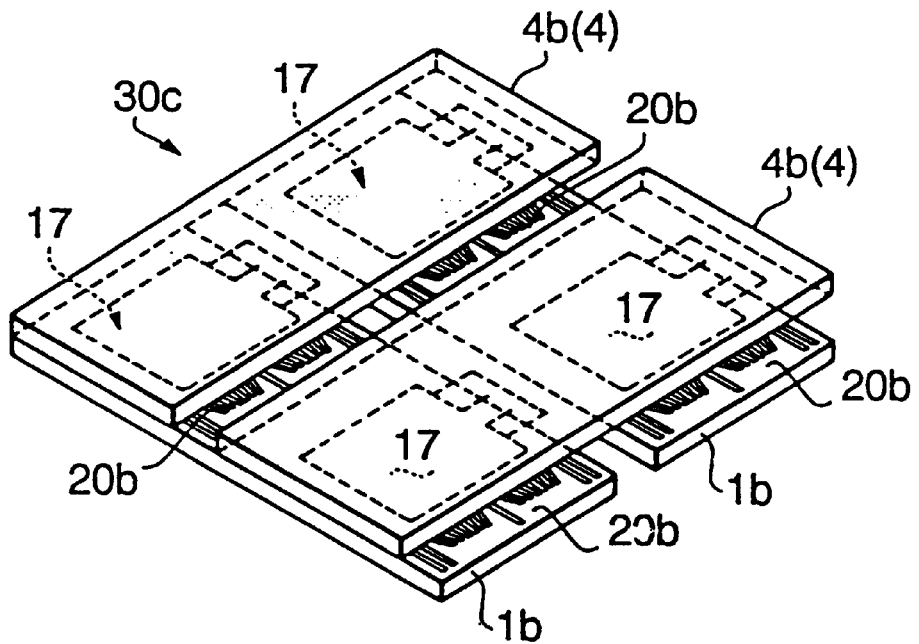
FIG. 17 is a perspective view showing the panel structure turned upside down.

FIG. 17 is a view showing the large-area empty panel 30c of FIG. 16 turned upside down. The plurality 35 of connecting terminals of the connecting terminals 20b are connected to the wirings formed on the inner sides of the opposing substrate 1and the substrate 4 within the liquid crystal sealing-in areas, as a result of which each pixel of a liquid crystal display section becomes conductive through the wiring.

In Step P7 of FIG. 19 in which the liquid crystal is injected, the large-area empty panel 30c of FIG. 16 is placed in a space with reduced pressure, followed by dripping of the liquid crystal at each liquid crystal injection opening 16a, after which the pressure around the empty panel 30c is returned back to atmospheric pressure, whereby the liquid crystal is injected into each of the liquid crystal sealing-in areas 17. In the following Step P8 in which the liquid crystal is sealed in the area 17, each liquid crystal sealing-in area 17 is filled with the liquid crystal, followed by sealing of each of the liquid crystal injection opening 16a with a sealing agent.

In Step P9 in which a lighting test is performed, the sealing of each of the openings 16a in the large-area liquid crystal panel 30c of FIGS. 16 and 17 is followed by various electrical tests performed by contacting a test terminal to the connecting terminals of the exposed connecting terminal sections 20a and 20b. For example, a lighting test for each of the liquid crystal display sections is performed. The light test is performed to check for possible pixel defects visually or by image processing, when each of the pixels of the liquid crystal display-sections are completely turned on and off. Then, when necessary, corrections are made.

Step P10 of FIG. 19 is performed to mount an integrated circuit. When producing a driver mounted type liquid crystal panel, or the so-called chip-on-glass (COG) type liquid crystal panel, using the above-described large-area liquid crystal panel 30c as material, an external terminal of an integrated circuit chip 31, used as an electrical part, is connected to each connecting terminal in the connecting terminal sections 20b through an anisotropic conductive film (ACF) so as to allow electrical conduction. A driving circuit is built in each integrated circuit chip 31 in order to selectively drive the plurality of electrodes formed on the opposing substrate 1 and the substrate 4 for liquid crystal display. Although not shown in the figure, a driving circuit is also connected to each of the connecting terminal sections 20b of the substrate 4b (4) so as to allow electrical conduction.

As regards the liquid crystal panel, there may be cases where a tape carrier package (TCP), being an electrical part with an IC chip mounted to a flexible print plate using tape automated bonding (TAB) techniques, is to be connected to a liquid crystal panel, or an IC chip is to be connected to a liquid crystal panel using a flexible wiring plate as an electrical part, in addition to the case where the aforementioned COG type liquid crystal is to be produced. In addition, it is possible to produce a driver built-in type panel by forming an active element and a drive circuit within the connecting terminal section at the same time.

In Step 11 of FIG. 19 in which a display drive test is performed, the liquid crystal display characteristics of the liquid crystal panel can be inspected after mounting the integrated circuit chip 31 by performing various electrical tests, such as a liquid crystal display driving test or operation test, on the resulting large-area liquid crystal panel 30c after connection of the integrated circuit chip 31. It is also possible to perform the various electrical tests on the liquid crystal panel, while an electrical member other than the integrated circuit chip 31, such as a TCP or a flexible wiling plate, remains connected to the large-area liquid crystal panel 30c, when such electrical members are connected to the connecting terminal sections 20b.

Figure 18:
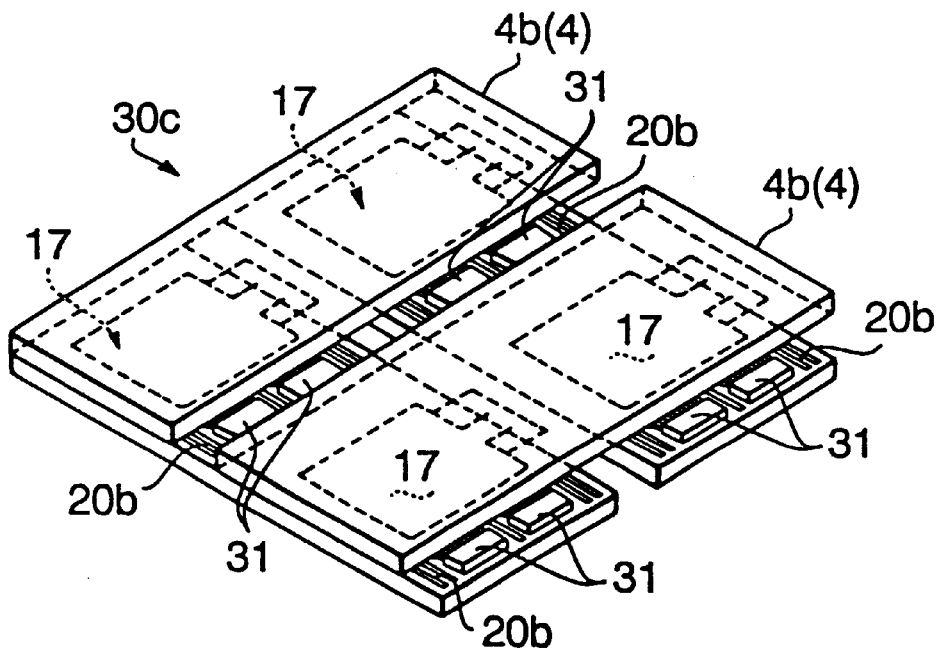
FIG. 18 is a perspective view illustrating a step following the step of FIG. 17.

After performing electrical connection and electrical tests on the large-area liquid crystal panel 30c, the opposing substrate 1 and the substrate 4 are cut and divided into the individual liquid crystal panel sections. Accordingly, as shown in FIG. 18, in the large-area liquid crystal panel 30c, the panel sections 1b, which are formed parallel to each other, cross the panel sections 4b, which are also formed parallel to each other. Therefore, the individual liquid crystal panel sections can be divided by cutting either one of the opposing substrate 1 and the substrate 4. Consequently, the panel 30c can be cut into the individual liquid crystal panel sections, without creating a stress in the liquid crystal panel structure, thereby allowing proper division of the panel into the individual liquid crystal panel sections.

As can be understood from the foregoing description, in this embodiment, all of the steps from the substrate processing Step P1 to the display driving testing step P11 can be performed without cutting one of the large-area transparent substrates, nor the large-area empty panel, or the large-area liquid crystal panel, thus making it unnecessary to perform the liquid injection step P7 or the liquid crystal sealing step P8 on a plurality of intermediate-area panels, as has been conventionally the case. In addition, the lighting test step, Step P9, the integrated circuit mounting step P10, and the display driving test step P11, can also be per-formed without completely cutting the large-area panel, thus making it unnecessary to cut the panel into individual panels to perform these steps.

Therefore, since the aforementioned steps can be performed without completely cutting the large-area panel, the manhour required and the number of steps are correspondingly reduced, and, for example, jigs, containers, or other devices no longer need to be used in correspondence with the different-sized panels, thus permitting each of the production steps of FIG. 19 to be performed on the same large-area panel manufacturing line. This results in reduced production costs and manufacturing time, that is increased production efficiency.

When the liquid crystal injection portion removing step P5, and the connecting terminal section removing step P6 are performed one after the other, Step P6 can precede Step P5. In addition, when the substrate removing step comprises the liquid crystal injection portion removing step P5, and the connecting terminal section removing step P6, only portions of the substrate that need to be cut are cut and separated, so that the next step can be performed on the large-area panel without cutting it into smaller panel sections, thus making it easier to wash the panel after substrate removal, and preventing production failures resulting form flying glass pieces. Although poor connection is very likely to occur due to pieces of glass that adhere onto the connecting section when, for example, an integrated circuit chip or a flexible substrate is connected to the connecting terminal section this embodiment ensures that such problems will not occur.

Figure 20:
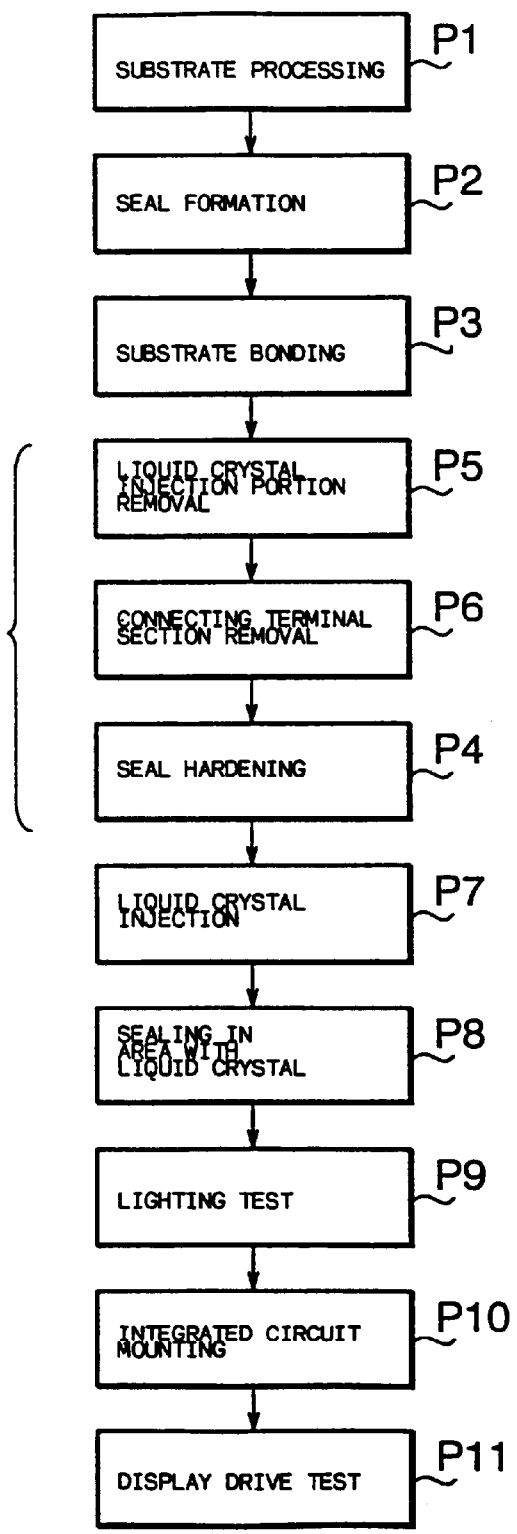
FIG. 20 is a flow chart of another liquid crystal panel producing method in accordance with the invention.

FIG. 20 illustrates another embodiment of a liquid crystal panel production method in accordance with the invention. This embodiment differs from the embodiment of FIG. 19 in that the seal 16 is hardened, not immediately after the opposing substrate 1 and the substrate 4 have been bonded together in Step P3, but after performing the liquid crystal injection portion removing step P5, and the connecting terminal section removing step P6, whereby portions of the opposing substrate 1 and the substrate 4 are removed.

According to this embodiment, the panel sections 1b and 1b can be easily and smoothly slid in the direction of arrow B in FIG. 24, since the seal 16 has not yet been hardened.

Figure 21:
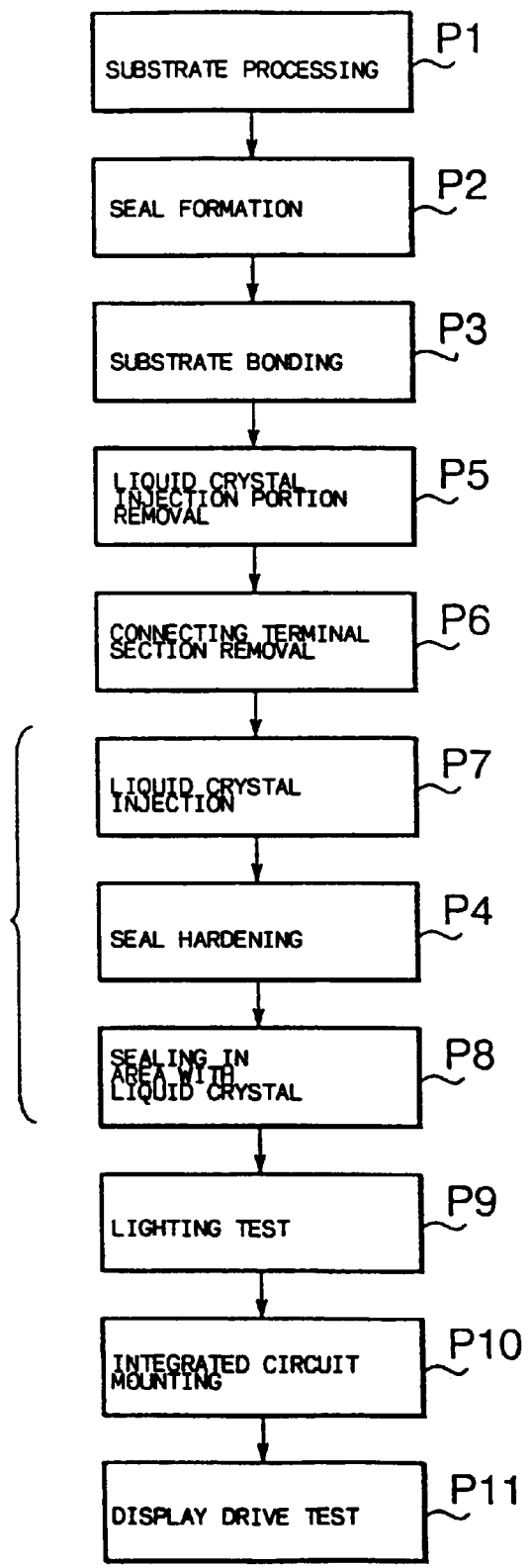
FIG. 21 is a flow chart of still another liquid crystal panel producing method in accordance with the invention.

FIG. 21 illustrates still another embodiment of a liquid crystal panel production method in accordance with the invention. The distinctive feature of this embodiment is that after performing the liquid crystal injection portion removing step P5, and the connecting terminal section removing step P6, in order to remove portions of the opposing substrate 1 and the substrate 4, the liquid crystal injection opening 16a is sealed, not immediately after injecting the liquid crystal (in the liquid crystal injection step P7) without hardening the seal 16, but after hardening the seal 16.

According to this embodiment, after liquid crystal injection, hardening of the seal 16 as well as sealing of the liquid crystal opening can be performed, while the opposing substrate 1 and the substrate 4 are kept spaced apart by a fixed distance, so that the liquid crystal panel can be formed to a precise thickness.

Figure 22:
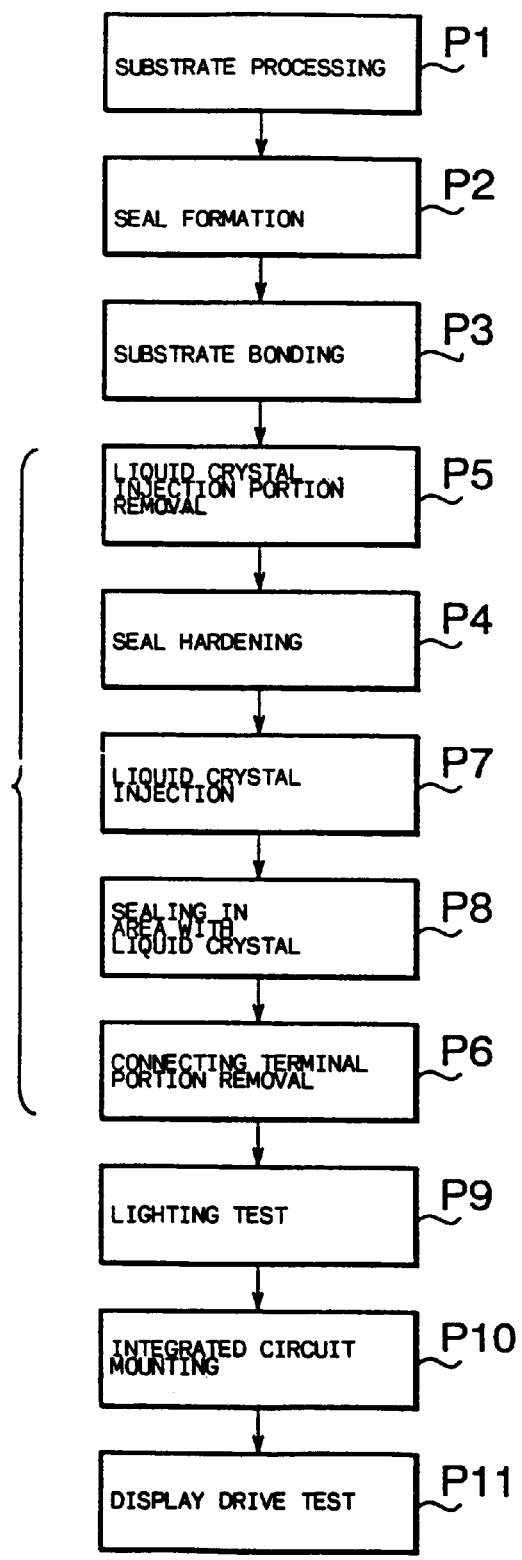
FIG. 22 is a flow chart of still another liquid crystal panel producing method in accordance with the invention.

FIG. 22 illustrates still another embodiment of a liquid crystal panel production method in accordance with the invention. The distinctive feature of this embodiment is that the seal hardening step P4, the liquid crystal injection step P7, and the liquid crystal sealing step P8, are performed between the liquid crystal injection portion removing step P5 and the connecting terminal section removing step P6, so that the step P5, and the step P6 are not performed one after the other.

Figure 25:
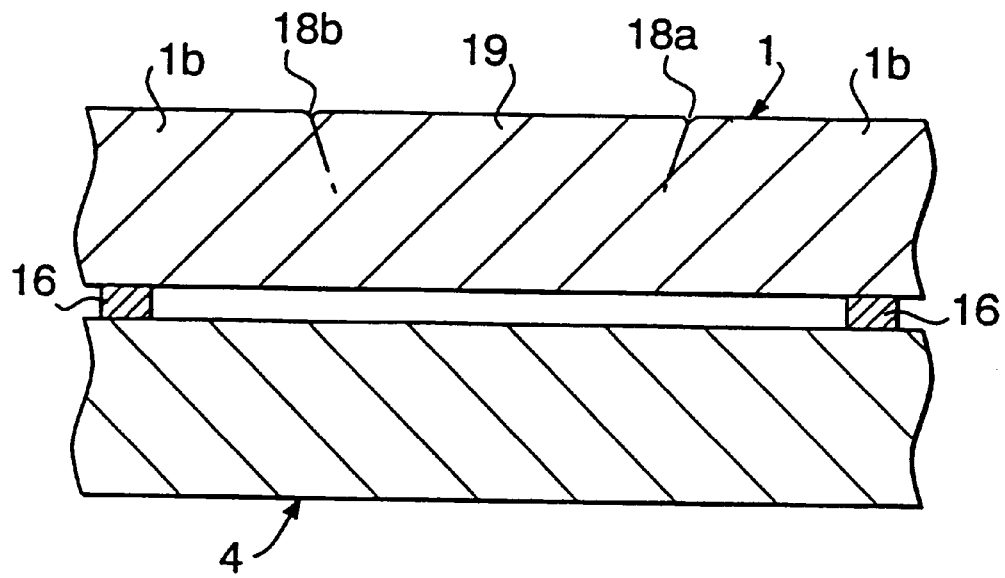
FIG. 25 is a section of another example of the substrate removing step.

FIG. 25 illustrates a main step of still another embodiment of a liquid crystal panel producing method in accordance with the invention. In this method, portions of a substrate are removed by a method other than those adopted in the previous embodiments illustrated in FIGS. 23 and 24.

Figure 26:
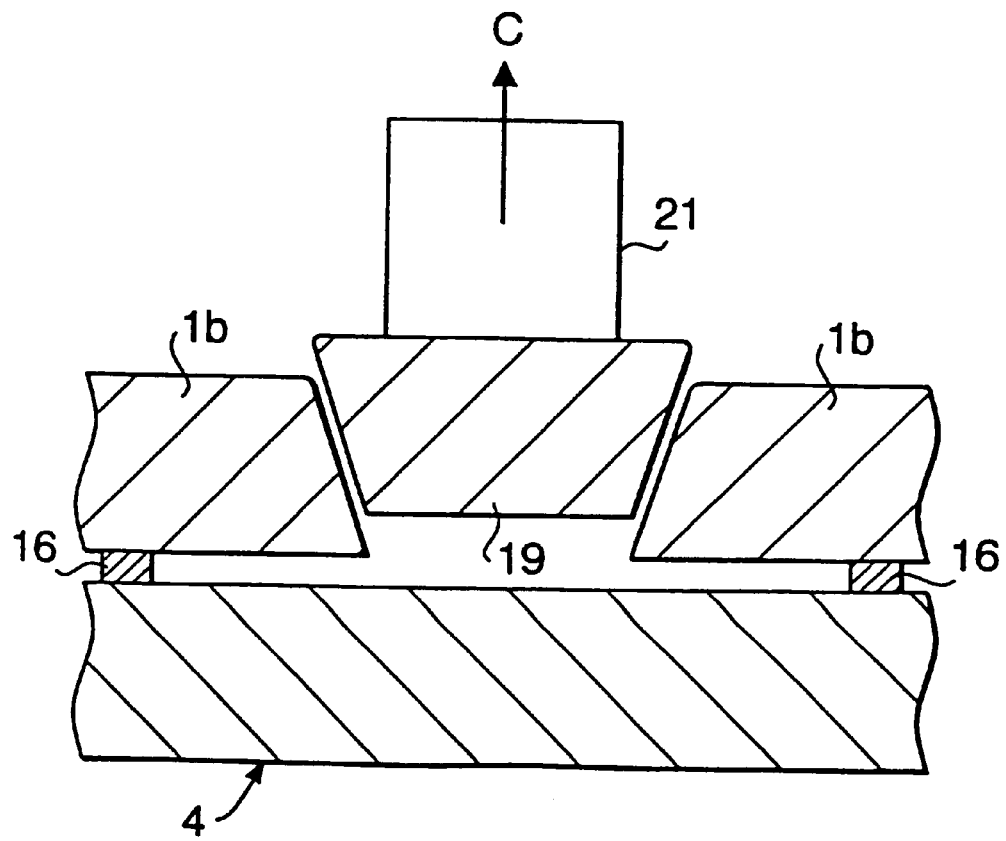
FIG. 26 is a section illustrating a step following the step of FIG. 25.

As illustrated in FIG. 25, the method includes or consists of forming scribed cuts 18a and 18b obliquely on the surface of the transparent substrate 1, and then exerting force onto the scribed cuts, forming oblique flanks. This forms a long-and-narrow portion 19, with the oblique ruptured faces forming the side faces thereof, so that, as shown in FIG. 26, when the separating tool 21, used to adsorb the long-and-narrow portion, is raised upward in the direction of arrow C, the long-and-narrow portion can be easily taken out, without having to apply force to the panel sections 1b and 1b. In this case, it is also possible to prevent the production of pieces of glass.

In the embodiment illustrated in FIG. 20, in order to ensure removal of the long-and-narrow portion 19, the seal hardening step P4, follows the substrate removing step comprising the liquid crystal injection portion removing step P5, and the connecting terminal section removing step P6, such that during removal of the long-and-narrow portion 19, the panel sections 1b and 1b on both sides of the long-and-narrow portion 19 can be readily moved away from the long-and-narrow portion 19. As shown in FIG. 26, however, when the side faces of the long-and-narrow portion 19 are oblique faces, the long-and-narrow portion 19 can be reliably removed without moving the panel sections 1b and 1b horizontally, so that during the substrate removing step, the seal does not necessarily have to be in a softened state. Therefore, the embodiment in which the side faces of the long-and-narrow portion 19 are oblique faces can be suitably applied to a producing method in which the seal hardening step P4 is performed before the substrate removing step (that is, the liquid crystal injection portion removing step P5 and the connecting terminal section step P6).

Figure 27:
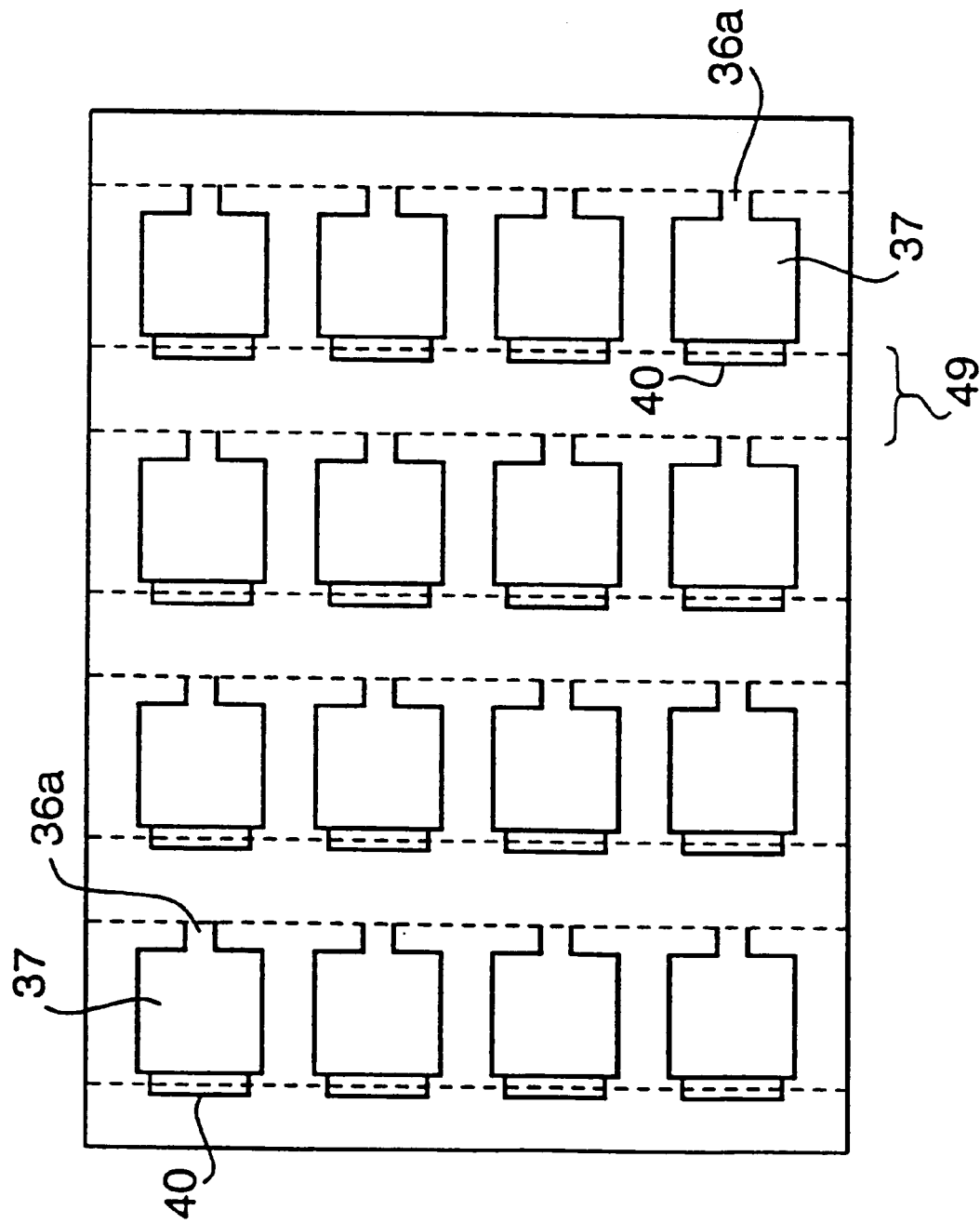
FIG. 27 is a plan view of still another embodiment of a liquid crystal panel producing method in accordance with the invention.

FIG. 27 illustrates still another embodiment of a liquid crystal panel producing method in accordance with the invention. In the producing method, the liquid crystal sealing-in areas 37 are disposed in an orderly and regular fashion, with each liquid crystal injection opening 36a and each connecting terminal section 40 disposed at opposite sides of its associated liquid crystal sealing-in area 37. In this case, opening of the liquid crystal injection openings 36a and the exposing of the connecting terminal sections 40 can take place at the same time. However, this is true only when the connecting terminal section 40 is formed on the inner face of the other substrate.

Accordingly, even in cases where the opening of the liquid crystal opening and the exposing of the connecting terminal section occur at the same time, that is performed in a single substrate removing step, the substrate removing step can be performed without completely cutting the large-area panel, and the number of steps in the substrate removing step can be reduced.

The connecting terminal sections may be formed on two or more sides of the liquid crystal sealing-in area. In such a case, it is possible to expose the connecting terminal section on one side at the same time the liquid crystal: injection opening 36a is opened, as shown in FIG. 27, and to expose the connecting terminal section on another side from another location where a portion of the substrate has been removed. In addition, it is possible to expose two or more connecting terminal sections on different sides of adjacent liquid crystal sealing-in areas from a common location where a portion of the substrate has been removed.

What is claimed is:

1. A method for producing a liquid crystal panel by forming a plurality of liquid crystal sealing-in areas between a pair of large-area substrates, at least one of said substrates being a light-transmitting substrate, and cutting said plurality of liquid crystal scaling-in areas into separate areas, said method comprising:

forming transparent electrodes which form a plurality of liquid crystal panels on a surface of each substrate of said pair of large-area substrates;

forming a plurality of seals, each of which surround said transparent electrodes required to form one liquid crystal panel, on the electrode-formed surface of one of said pair of large-area substrates to form said plurality of liquid crystal sealing-in areas, and forming liquid crystal injection openings in each of said plurality of seals;

bonding together said pair of large-area substrates such that said transparent electrodes of a first one of said pair of large-area substrate faces said transparent electrodes of a second one of said pairs of said large-area substrates, with said seals interposed between said substrates;

removing a portion of one of said pair of large-area substrates bonded together such that at least one of said liquid crystal injection openings is exposed;

injecting liquid crystal into said liquid crystal sealing-in area through at least one of said liquid crystal injection openings, and then scaling said liquid crystal injection opening; and dividing said pair of bonded large-area substrates into separate liquid crystal panels after the liquid crystal injection.

2. A method for producing a liquid crystal panel according to claim 1, further comprising forming an active element group, connected to said transparent electrodes for electrical conduction, on a surface of one of said pair of large-area substrates.

3. A method for producing a liquid crystal panel according to claim 1, wherein said pair of large-area substrates are glass substrates, and wherein said step of removing a portion of one of said pair of large-area substrates comprises forming a cut on a surface of one of said glass substrates, and cutting along said cut by applying a force to said cut, in order to remove a portion of one of said large-area substrates.

4. A method for producing a liquid crystal panel according to claim 3, wherein said step of removing a portion of one of said pair of large-area substrates comprises removing said portion from at least one of said large-area substrates, with a gap formed around said portion to be removed formed by said cutting.

5. A method for producing a liquid crystal panel according to claim 1, wherein said step of forming a plurality of seals comprises forming said plurality of seals such that said liquid crystal injection openings in said seals are arranged in straight lines, and wherein said step of removing a portion of one of said pair of large-area substrates comprises forming two linear cuts along a direction of arrangement of said plurality of liquid crystal injection openings disposed in straight-lines, and removing a long-and-narrow portion, bordered by said linear cuts, from one of said large-area substrates.

6. A method for producing a liquid crystal panel according to claim 5, wherein said step of removing a portion of one of said pair of large-area substrates comprises removing the long-and-narrow portion from said large-area substrate, while panel sections disposed on both sides of said long-and-narrow portion are shifted away from said long-and-narrow portion, and wherein said method further comprises hardening at least one of said plurality of seals after said step of removing a portion of one of said pair of large-area substrates.

7. A method for producing a liquid crystal panel according to claim 5, wherein said two linear surface cuts are formed such that said long-and-narrow portion tapers from narrow to wide from the inner side to the outer side of said portion.

8. A method for producing a liquid crystal panel according to claim 5, wherein said step of forming a plurality of seals comprises forming two or more rows of said plurality of seals arranged such that said liquid crystal injection openings are disposed in straight lines, with said liquid crystal openings of said seals adjacent to each other and of different rows, forming pairs of openings, facing each other.

9. A method for producing a liquid crystal panel according to claim 1, wherein said step of removing a portion of one of said pair of large-area substrates comprises removing a window-shaped portion from one of said pair of large-area substrates.

10. A method for producing a liquid crystal panel according to claim 9, wherein said step of forming a plurality of seals comprises forming two or more rows of said plurality of seals arranged such that said liquid crystal injection openings are disposed in straight lines, with said liquid crystal openings of said seals adjacent to each other and of different rows, forming pairs of openings, facing each other, and wherein said step of removing a portion of one of said pair of large-area substrates comprises cutting out and removing a window-shaped portion from one of said large-area substrates such that said liquid crystal injection openings forming a pair of facing openings are exposed to the outside at the same time.

11. A method for producing a liquid crystal panel by forming a plurality of liquid crystal sealing-in areas between a pair of large-area substrates, at least one of said substrates being a light-transmitting substrate, and dividing said plurality of liquid crystal sealing-in areas into separate areas, said method comprising:

forming transparent electrodes which form a plurality of liquid crystal panels and a connecting terminal connected thereto on a surface of each substrate of said pair of large-area substrates;

forming a plurality of seals, each of which surround said transparent electrodes required to form one liquid crystal panel, on the electrode-formed surface of one of said pair of large-area substrates to form said plurality of liquid crystal scaling-in areas, forming liquid crystal injection openings in each of said plurality of seals, and forming connecting terminal sections around each of said liquid crystal sealing-in areas;

bonding together said pair of large-area substrates such that said transparent electrodes of a first one of said pair of large-area substrate faces said transparent electrodes of a second of said pair of large-area substrates, with said seals interposed between said substrates;

removing a portion of one of said pair of large-area substrates bonded together such that at least one of said liquid crystal injection openings and at least one of said connecting terminal sections are exposed;

injecting liquid crystal into said liquid crystal sealing-in area through at least one of said liquid crystal injection opening, and then sealing said liquid crystal injection opening; and dividing said pair of bonded large-area substrates into separate liquid crystal panels after the liquid crystal injection.

12. A method for producing a liquid crystal panel according to claim 11, wherein said step of removing a portion of one of said pair of large-area substrates comprises two separate steps of removing a portion of said large-area substrate such that at least one of said liquid crystal injection openings is exposed to the outside, and removing a portion of said large-area substrate such that at least one of said connecting terminal sections is exposed to the outside.

13. A method for producing a liquid crystal panel according to claim 11, further comprising performing an electrical test through said connecting terminal section exposed to the outside, wherein said electrical test is performed between said injecting of said liquid crystal and said dividing of said pair of bonded large-area substrates.

14. A method for producing a liquid crystal panel according to claim 11, wherein said step of removing a portion of one of said pair of large-area substrates comprises removing long-and-narrow portions of said pair of large-area substrates such that said long-and-narrow portion of said one large-area substrate intersects said long-and-narrow portion of said other large-area substrate.

15. A method for producing a liquid crystal panel according to claim 11, wherein said pair of large-area substrates are glass substrates, and wherein said step of removing a portion of one of said pair of large-area substrates comprises forming a cut in a surface of one of said glass substrates, and cutting along said cut by applying a force to said cut, whereby a portion of one of said large-area substrates is removed.

16. A method for producing a liquid crystal panel according to claim 15, wherein said step of removing a portion of one of said pair of large-area substrates comprises removing said portion from said large-area substrate, with a gap formed around said portion to be removed formed by said cutting.

17. A method for producing a liquid crystal panel according to claim 15, wherein a cut is formed such that said long-and-narrow portion tapers from narrow to wide from the inner side to the outer side of said portion.

18. A method for producing a liquid crystal panel according to claim 13, wherein said electrical test is performed after connection of at least one electrical member to said connecting terminal section.

* * * * *